(12) United States Patent
Koeger et al.

(10) Patent No.: US 11,938,351 B2
(45) Date of Patent: Mar. 26, 2024

(54) NBC FILTRATION SYSTEMS

(71) Applicant: BETH-EL ZIKHRON YAAQOV INDUSTRIES LTD., Zikhron Yaaqov (IL)

(72) Inventors: Samuel Koeger, Zikhron Yaaqov (IL); Jonathan Schneider, Zikhron Yaaqov (IL)

(73) Assignee: BETH-EL ZIKHRON YAAQOV INDUSTRIES LTD., Zikron Yaaqov (IL)

( * ) Notice: Subject to any disclaimer, the term of this patent is extended or adjusted under 35 U.S.C. 154(b) by 419 days.

(21) Appl. No.: 17/299,577

(22) PCT Filed: Apr. 2, 2019

(86) PCT No.: PCT/IL2019/050379
§ 371 (c)(1),
(2) Date: Jun. 3, 2021

(87) PCT Pub. No.: WO2020/136631
PCT Pub. Date: Jul. 2, 2020

(65) Prior Publication Data
US 2022/0032092 A1    Feb. 3, 2022

(30) Foreign Application Priority Data
Dec. 23, 2018   (IL) .......................................... 263915

(51) Int. Cl.
*A62B 13/00*   (2006.01)
*A62B 7/10*    (2006.01)
(Continued)

(52) U.S. Cl.
CPC ................ *A62B 13/00* (2013.01); *A62B 7/10* (2013.01); *B01D 46/0005* (2013.01);
(Continued)

(58) Field of Classification Search
CPC ........... A62B 13/00; A62B 7/10; A62B 11/00; A62B 23/04; B01D 46/0005;
(Continued)

(56) References Cited

U.S. PATENT DOCUMENTS 2,884,091 A * 4/1959 Baldwin ............... B01D 46/521
55/502
3,817,380 A * 6/1974 Brown ................. B01D 35/147
210/223
(Continued)

FOREIGN PATENT DOCUMENTS

CN         207714572 U  *  8/2018
DE    10 2010 025 971        1/2012
(Continued)

*Primary Examiner* — Stephen Hobson
(74) *Attorney, Agent, or Firm* — The Law Office of Joseph L. Felber

(57) ABSTRACT

A collective NBC filtration system (FIG. 1A) for providing positive-pressure purified air to a plurality of subjects in a protected space, or in an environment which cannot be maintained at positive pressure, in conjunction with one or more facepiece fluidly connected to the NBC filtration system. The system comprises: A casing body [102] including a first section [136] defining an inner volume therein, and a second section [138] adjacent to the first section. The second section includes an inlet port [116], The first section has a larger cross-section than the second section, and forms a peripheral first ledge [142] surrounding the second section. At least one NBC filter accommodated in the inner volume. The at least one NBC filter is supported on the first ledge [142], A lid [104] including a central portion [154] and a second ledge [152] surrounding the central portion. The central portion [154] includes a plurality of outlet ports [118], which are sealable. The lid [104] is openable to provide access to the inner volume and is securely closeable to affix the at least one NBC filter therein the inner volume (Continued)

by the second ledge [152], The lid [104] and the at least one NBC filter define, when the lid is securely closed, an outlet compartment there between. The outlet compartment has about the same cross-section as the second section. A blower [108] housed within the second section. A suction port of the blower being fluidly coupled to the inlet port. The system is configured such that the second section [138] fluidly couples the inlet port [116] to at least one inlet of the respective at least one NBC filter, and, when the lid [104] is securely closed, the outlet compartment [302] fluidly couples at least one outlet of the respective at least one NBC filter to the one or more outlet ports [118] but is otherwise fluidly sealed, thereby preventing potentially contaminated air from entering the outlet compartment, except via the at least one NBC filter.

19 Claims, 11 Drawing Sheets

(51) Int. Cl.
| | | |
|---|---|---|
| B01D 46/00 | (2022.01) | |
| B01D 46/12 | (2022.01) | |
| B01D 46/24 | (2006.01) | |
| B01D 46/58 | (2022.01) | |
| B60H 1/00 | (2006.01) | |
| B60H 3/06 | (2006.01) | |
| *A62B 11/00* | (2006.01) | |
| *A62B 23/04* | (2006.01) | |
| *B01D 46/10* | (2006.01) | |

(52) U.S. Cl.
CPC ......... *B01D 46/0031* (2013.01); *B01D 46/12* (2013.01); *B01D 46/2411* (2013.01); *B01D 46/58* (2022.01); *B60H 1/00414* (2013.01); *B60H 3/0641* (2013.01); *A62B 11/00* (2013.01); *A62B 23/04* (2013.01); *B01D 46/10* (2013.01); *B01D 2271/022* (2013.01); *B01D 2279/35* (2013.01)

(58) Field of Classification Search
CPC ............................ B01D 46/0031; B01D 46/12; B01D 46/2411; B01D 46/58; B01D 46/10; B01D 2271/022; B01D 2279/35; B60H 1/00414; B60H 3/0641

See application file for complete search history.

(56) References Cited

U.S. PATENT DOCUMENTS

| | | | | |
|---|---|---|---|---|
| 4,430,995 | A * | 2/1984 | Hilton | A62B 7/10 128/205.12 |
| 4,865,637 | A * | 9/1989 | Gruber | B01D 46/521 55/497 |
| 4,898,602 | A * | 2/1990 | Gruber | B01D 46/10 55/498 |
| 7,442,237 | B1 * | 10/2008 | Gardner | A62B 23/02 55/DIG. 35 |
| 8,828,112 | B2 * | 9/2014 | Whittier | B01D 46/2411 55/482 |
| 9,067,154 | B1 * | 6/2015 | Branscomb | B01D 27/08 |
| 2005/0194387 | A1 * | 9/2005 | Banks | A61L 2/26 220/372 |
| 2005/0235614 | A1 * | 10/2005 | Smith | B01D 46/2414 55/309 |
| 2009/0080811 | A1 * | 3/2009 | Stefanek | B65D 81/18 383/61.3 |
| 2011/0005995 | A1 * | 1/2011 | Butler | B01D 29/073 156/187 |
| 2011/0308524 | A1 * | 12/2011 | Brey | A62B 23/02 128/205.12 |
| 2012/0055126 | A1 * | 3/2012 | Whittier | B01D 53/0431 55/482 |
| 2017/0239381 | A1 * | 8/2017 | Cohen | A61B 50/30 |
| 2017/0326557 | A1 * | 11/2017 | Schlemmer | B03C 3/025 |
| 2017/0363111 | A1 * | 12/2017 | Hur | B01D 46/24 |
| 2021/0393994 | A1 * | 12/2021 | Koeger | B01D 46/10 |
| 2023/0375199 | A1 * | 11/2023 | Delmiglio | A61L 2/26 |

FOREIGN PATENT DOCUMENTS

| | | | | |
|---|---|---|---|---|
| EP | 2803387 | A2 * | 11/2014 | A62B 23/04 |
| FR | 2764518 | A1 * | 12/1998 | A62D 9/00 |
| WO | WO-2004103475 | A1 * | 12/2004 | A62B 13/00 |
| WO | WO-2008081489 | A1 * | 7/2008 | A62B 23/02 |
| WO | WO-2014192037 | A1 * | 12/2014 | A62B 19/00 |
| WO | WO-2018138716 | A1 * | 8/2018 | A62B 19/00 |
| WO | WO-2018229743 | A1 * | 12/2018 | A62B 11/00 |

* cited by examiner

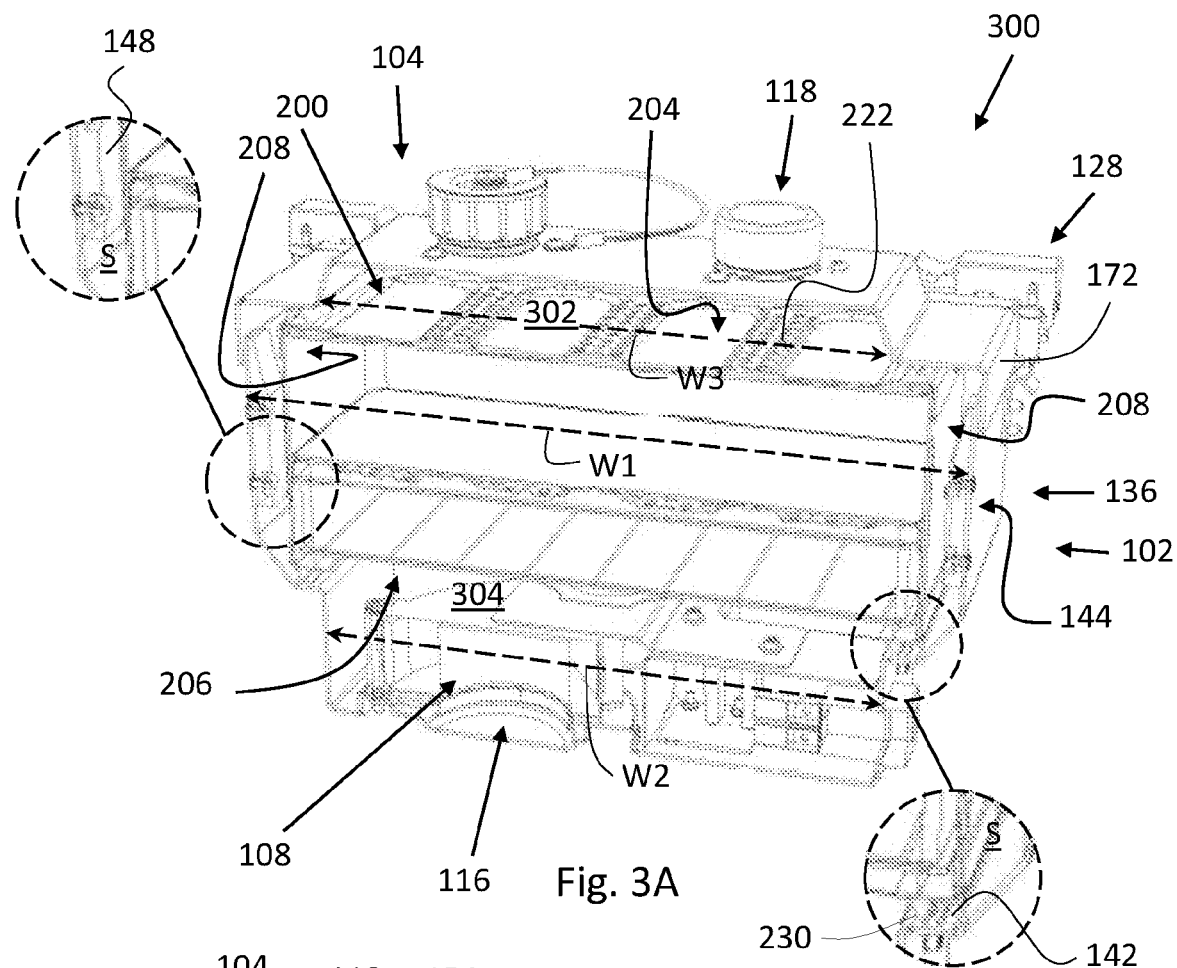
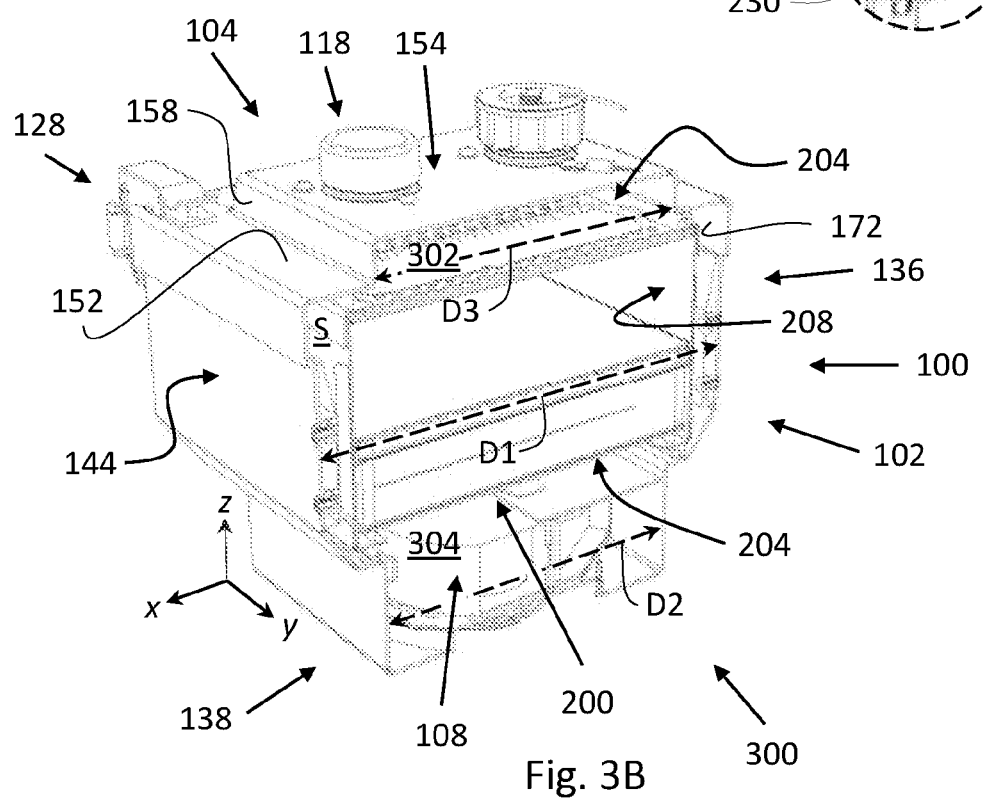
Fig. 3A
Fig. 3B

NBC FILTRATION SYSTEMS

TECHNICAL FIELD

The present disclosure relates generally to nuclear, biological, and chemical (NBC) filtration systems, particularly, but not exclusively, for use in vehicles.

BACKGROUND

An individual NBC filtration system is configured to supply purified air, which may be at positive pressure, to a subject (e.g. individual/person) equipped with a facepiece (e.g. a gas mask). As used, herein, a collective NBC filtration system may refer to an NBC filtration system configured to provide positive-pressure purified air to a plurality of subjects in a protected space (e.g. an over-pressurized vehicle cabin), or in an environment which is not over-pressurized—such as a vehicle wherein positive pressure cannot be established/maintained—in which case each of the subjects will be equipped with a facepiece fluidly connected to the NBC filtration system. Advantageously, such collective NBC filtration systems will typically be powered by the vehicle's electrical system and are less cumbersome to a subject, as the subject does not have to carry a filtration unit on their person.

An example of an individual pressurized NBC filtration system is demonstrated in U.S. Pat. No. 4,430,995 to Hilton disclosing an air-purifying device for respirators of the positive pressure type. The device comprises an expandable chamber having an outlet for connection to a facepiece, for example, a face mask, and an inlet connected to a pump for drawing ambient air into the device through a filter and pumping it into the chamber. In use, the wearer of the face mask draws air from the chamber and that air is replenished by operation of the pump.

U.S. Pat. No. 4,898,602 to Gruber discloses a selectively openable filtering assembly which includes a filter member for treating a fluid passing therethrough and a cover member for sealing the filter member against communication with the environment. A remotely activated device is provided for opening the cover member to expose the filter member to the environment when it is desired to use the filter member.

U.S. Pat. No. 4,865,637 to Gruber discloses a filter cartridge for treating a fluid passing therethrough. The filter cartridge includes a filtering medium and a support container for holding the filtering medium. The support container includes a solid side wall having first and second ends and a pair of perforated end walls, one located on each end of the side wall. A pair of connectors is provided for securing a respective one of the end walls to a respective end of the side wall. A sleeve secures the connectors to the side wall in a substantially leak-proof manner.

There remains a need in the art for improved collective NBC filtration systems for use in vehicles.

SUMMARY

Aspects of the disclosure, according to some embodiments thereof, relate to collective NBC filtration systems. More specifically, but not exclusively, aspects of the disclosure, according to some embodiments thereof, relate to collective NBC filtration systems for providing positive-pressure purified air to a plurality of subjects in a protected space (e.g. a sealed vehicle cabin) or in an environment which cannot be maintained at positive pressure, such as an unsealed, or even open, vehicle, e.g. a jeep, tank, or helicopter. In the latter case, each of the subjects may be equipped with a facepiece fluidly connected to the NBC filtration system. Further, the disclosed collective NBC filtration systems, according to some embodiments thereof, may be used both to provide positive-pressure purified air to a plurality of subjects in a protected space, as well as to individually supply positive-pressure purified air to each of the subjects in the event that the protected space has been compromised/breached. Finally, the disclosed NBC filtration systems, according to some embodiments thereof, may be used as backup NBC filtration systems, e.g. in large vehicles—which are capable of maintaining positive pressure—in the event of failure of the primary NBC filtration system.

The present application discloses a collective NBC filtration system configured to supply purified air at positive-pressure to a plurality of subjects, each equipped with a facepiece which is fluidly connected to the NBC filtration system. The NBC filtration system includes a casing and an NBC filter configured to be accommodated within the casing. The casing includes a casing body, an openable lid, and a blower housed within the casing body.

According to some embodiments, the casing is configured such as to allow storing therein the NBC filter, prior to use, when the NBC filter is fully covered by an air-proof wrapping, such that the NBC filter is securely held within the casing. Storing the (wrapped) NBC filter within the casing may have the advantages of: (i) saving valuable space (as free space within the casing is used) in small or cramped spaces such as within a combat vehicle; (ii) potentially affording the NBC filter better protection from damage, as the casing, which may be made of metal, may be far sturdier than the packaging/boxes typically used to store NBC filters; and (iii) reducing the chances of the NBC filter being misplaced, lost, or difficult to locate due to e.g. confusion and/or stress in an emergency situation.

Additionally or alternatively, according to some embodiments, the NBC filtration system incudes double sealing in the sense that not only the region around the filter outlet of the NBC filter is fluidly sealed (apart from fluidly coupling the filter outlet to outlet ports on the casing) by a first seal, but the region around the filter inlet of the NBC filter is also fluidly sealed (apart from fluidly coupling the blower to the filter inlet) by a second seal. Advantageously, the second seal serves to prevent over-pressurized potentially contaminated air from reaching the outlet of the NBC filter by bypassing the NBC filter, thereby ensuring that the NBC filtration system may continue to provide purified air even in the event that the first seal has been compromised (e.g. cracked or breached).

Additionally or alternatively, according to some embodiments, the casing body of the NBC filtration system consists of a single piece and includes fasteners allowing to attach the NBC filtration system to a surface (e.g. a wall), and as such does not require assembling (e.g. installing onto a mounting frame). Advantageously, the NBC filter may be mounted at any orientation, and consequently from a surface of any orientation (e.g. upside down from the ceiling of a vehicle). According to some such embodiments, the casing body is integrally formed, e.g. by pressing, which may reduce production costs and allow for simpler assembly, as well as potentially increasing the durability of the casing body as compared e.g. to casing bodies composed of soldered/welded parts which may be prone to the formation of cracks and/or rust, along the soldering/welding seams.

Additionally or alternatively, according to some embodiments, the lid is mechanically secured to the casing body using self-adjusting coupling elements (e.g. spring-based coupling elements) without requiring any adjustment or fine-tuning on the part of the user, as may be required when screws are used. Advantageously, when a coupling element is not properly locked, due to the self-adjusting property thereof, a lever of the coupling lock element is lifted, so that the improper locking is apparent. Consequently, a state in which one of the coupling elements is not properly locked, and therefore the lid is not securely closed (so that the region around the filter outlet is not fluidly sealed), is clearly distinguishable by an unaided eye from the state in which all of the coupling elements are properly locked.

Thus, according to an aspect of some embodiments, there is provided an NBC filtration system configured to provide positive-pressure, purified air to one or more outlet ports. The system includes:

A casing body including a first section defining an inner volume therein, and a second section adjacent to the first section. The second section includes an inlet port. The first section has a larger cross-section than the second section, and forms a peripheral first ledge surrounding the second section;

At least one NBC filter accommodated in the inner volume. The at least one NBC filter is supported on the first ledge.

A lid including a central portion and a second ledge surrounding the central portion. The central portion includes a plurality of outlet ports, which are sealable. The lid is openable to provide access to the inner volume and is securely closeable to affix the at least one NBC filter therein the inner volume by the second ledge. The lid and the at least one NBC filter define, when the lid is securely closed, an outlet compartment there between. The outlet compartment has about the same cross-section as the second section.

A blower housed within the second section. A suction port of the blower being fluidly coupled to the inlet port.

The system is configured such that the second section fluidly couples the inlet port to at least one inlet of the respective at least one NBC filter, and, when the lid is securely closed, the outlet compartment fluidly couples at least one outlet of the respective at least one NBC filter to the one or more outlet ports but is otherwise fluidly sealed, thereby preventing potentially contaminated air from entering the outlet compartment, except via the at least one NBC filter.

According to some embodiments, the central portion of the lid projects relative to the second ledge and the lid further includes lid sidewalls connecting the central portion and the second ledge.

According to some embodiments, the first ledge is positioned between the first section and the second section, such as to connect the first section and the second section. The first ledge may project inwardly from sidewalls of the first section.

According to some embodiments, the NBC filter includes a first seal disposed around the outlet of the NBC filter. The first seal may be configured to effect the fluid-sealing of the outlet compartment.

According to some embodiments, the second ledge includes a first seal circumferentially disposed there along on an inner surface of the lid. The first seal may be configured to effect the fluid-sealing of the outlet compartment.

According to some embodiments, the NBC filter further includes a second seal disposed around the inlet of the NBC filter, such that, when the lid is securely closed, apart from fluidly coupling the inlet port to the inlet of the NBC filter, the second section is fluidly sealed.

According to some embodiments, the casing body includes a second seal circumferentially disposed on the first ledge, such that, when the lid is securely closed, apart from fluidly coupling the inlet port to the inlet of the NBC filter, the second section is fluidly sealed.

According to some embodiments, the first seal and/or the second seal include rubber.

According to some embodiments, when the NBC filter is accommodated in the casing body and the lid is securely closed, sidewalls of the casing body and sidewalls of the NBC filter define a space between the first seal and the second seal that is ventilated to the atmosphere, the system being thereby configured to continue to provide pressurized purified air also when one of the seals has been compromised.

According to some embodiments, the sidewalls of the casing body include spacers configured to facilitate placement of the NBC filter within the casing body.

According to some embodiments, the one or more outlet ports are configured to be connected to air-ducts of face-pieces.

According to some embodiments, the one or more outlet ports include at least four outlet ports.

According to some embodiments, the second section includes an electrical switch and a socket electrically associated with the blower.

According to some embodiments, the system is further configured to accommodate in the inner volume the NBC filter, when the NBC filter is sealed within an air-proof wrapping, such that, when the lid is securely closed, the NBC filter is securely stored within the casing.

According to some embodiments, the system further includes self-adjusting one or more coupling elements mechanically associating the casing body and the lid. The one or more coupling elements may be configured to press on the NBC filter, when the NBC filter is accommodated in the casing body and the lid is securely closed, such as to (i) fluidly seal the outlet compartment when the NBC filter is unwrapped, and (ii) secure the NBC filter when the NBC filter is wrapped.

According to some embodiments, the one or more coupling elements includes are spring-based.

According to some embodiments, the one or more coupling elements include at least four springs.

According to some embodiments, the filtration system is substantially shaped as a cuboid.

According to some embodiments, the filtration system is substantially cylindrical.

According to some embodiments, the NBC filter is shaped, or substantially shaped, as a cuboid.

According to some embodiments, the NBC filter is cylindrical.

According to some embodiments, the one or more coupling elements include levers mechanically associated with the springs such that, when the levers are fastened, the lid is securely closed.

According to some embodiments, the casing body includes fasteners configured to secure the system to a surface. The casing body may consist of a single piece.

According to some embodiments, the system is further configured to be secured onto a surface of any orientation.

According to some embodiments, the system is further configured to be secured at any orientation thereof.

According to some embodiments, the casing body is integrally formed.

According to some embodiments, the casing body is integrally formed by pressing.

According to some embodiments, the wrapping of the NBC filter includes a polymeric layer coated by an air-proof coating.

According to some embodiments, the air-proof coating includes aluminum.

According to some embodiments, the NBC filter includes a particulate filter and/or a carbon filter.

According to some embodiments, the at least one NBC filter includes two or more NBC filters. The system may further include an NBC filter assembly accommodated within the inner volume. The NBC filter assembly includes a frame and the two or more NBC filters, which are mounted within the frame.

According to some embodiments, the system is configured for use in a vehicle.

According to an aspect of some embodiments, there is provided an NBC filtration system configured to provide positive-pressure, purified air to one or more sealable outlet ports. The system includes:

A casing body including an inlet port. The casing body defines an inner volume there within.

At least one NBC filter accommodated within the inner volume.

A lid including one or more outlet ports, which are sealable. The lid is openable to provide access to the inner volume and is securely closeable to affix the at least one NBC filter therein the inner volume. The lid and the at least one NBC filter define, when the lid is securely closed, an outlet compartment there between.

A blower housed within the casing body and fluidly coupled to the inlet port.

The system is configured such that at least one inlet of the respective at least one NBC filter is fluidly coupled to the blower, and such that, when the lid is securely closed, an outlet of the at least one NBC filter is fluidly coupled to the outlet compartment so as to fluidly couple the at least one outlet of the respective at least one NBC filter to the one or more outlet ports, the outlet compartment being otherwise fluidly sealed. The system is further configured to accommodate in the inner volume the at least one NBC filter, when the at least one NBC filter is sealed within an air-proof wrapping, such that, when the lid is securely closed, the at least one NBC filter is securely stored within the inner volume.

According to some embodiments, the system further includes self-adjusting one or more coupling elements mechanically associating the casing body and the lid. The one or more coupling elements are configured to press on the NBC filter, when the NBC filter is accommodated in the casing body and the lid is securely closed, such as to (i) fluidly seal the outlet compartment when the NBC filter is unwrapped, and (ii) secure the NBC filter within the inner volume when the NBC filter is wrapped.

According to some embodiments, the one or more coupling elements are spring-based.

According to some embodiments, the one or more coupling elements include at least four coupling elements. According to some such embodiments, the system is substantially shaped as a cuboid, and four of the coupling elements are positioned at the four top corners of the casing, respectively.

According to some embodiments, the one or more coupling elements include locks and levers mechanically associated with the springs such that, when the levers are fastened, the lid is securely closed.

According to some embodiments, the wrapping of the NBC filter includes a polymeric layer coated by an air-proof coating.

According to some embodiments, the air-proof coating includes aluminum.

According to some embodiments, the at least one NBC filter includes two or more NBC filters. The system may further include an NBC filter assembly accommodated within the inner volume. The NBC filter assembly includes a frame and the two or more NBC filters, which are mounted within the frame.

According to some embodiments, the system is configured for use in a vehicle.

According to an aspect of some embodiments, there is provided an NBC filtration system configured to provide positive-pressure, purified air to one or more sealable outlet ports. The system includes:

A casing body including a first section and a second section adjacent to the first section. The second section includes an inlet port.

At least one NBC filter accommodated within the first section.

A lid including one or more outlet ports, which are sealable. The lid is openable to provide access to the first section and is securely closeable to affix the NBC filter therein the first section. The lid and the NBC filter define, when the lid is securely closed, an outlet compartment there between.

A blower housed within the second section and fluidly coupled to the inlet port.

The system is configured such that when the lid is securely closed (i) an outlet of the NBC filter is fluidly coupled to the outlet compartment so as to fluidly couple the outlet of the NBC filter to the one or more outlet ports, the outlet compartment being otherwise fluidly sealed, and (ii) an inlet of the NBC filter is fluidly coupled to a suction port of the blower via the second section, the second section being otherwise fluidly sealed. The sealing of the second section prevents potentially contaminated air in the second section from entering the first section, except via the NBC filter.

According to some embodiments, the NBC filter includes a first seal disposed around the outlet of the NBC filter. The first seal may be configured to effect the fluid-sealing of the outlet compartment.

According to some embodiments, the lid includes a first seal circumferentially disposed on an inner surface of the lid. The first seal may be configured to effect the fluid-sealing of the outlet compartment.

According to some embodiments, the NBC filter further includes a second seal disposed around the inlet of the NBC filter. The second seal may be configured to effect the fluid-sealing of the second section.

According to some embodiments, the casing body includes a second seal circumferentially disposed on a ledge inside the casing body. The ledge may be configured to support the NBC filter. The second seal may be configured to effect the fluid-sealing of the second section.

According to some embodiments, when the NBC filter is accommodated in the casing body and the lid is securely closed, sidewalls of the casing body and sidewalls of the NBC filter define a space between the first seal and the second seal that is ventilated to the atmosphere, the casing being thereby configured to continue to provide purified air also when one of the seals has been compromised.

According to some embodiments, the first seal and/or the second seal include rubber.

According to an aspect of some embodiments, there is provided an NBC filtration system configured to provide positive-pressure, purified air to one or more sealable outlet ports. The system includes:

A casing body including an inlet port. The casing body defines an inner volume there within.

At least one NBC filter accommodated within the inner volume.

A lid including one or more outlet ports, which are sealable. The lid is openable to provide access to the inner volume and is securely closeable to affix the NBC filter therein the inner volume. The lid and the NBC filter define, when the lid is securely closed, an outlet compartment there between.

A blower housed within the casing body and fluidly coupled to the inlet port.

The system is configured such that an inlet of the NBC filter is fluidly coupled to the blower, and such that, when the lid is securely closed, an outlet of the NBC filter is fluidly coupled to the outlet compartment so as to fluidly couple the outlet of the NBC filter to the one or more outlet ports, the outlet compartment being otherwise fluidly sealed. The casing body includes fasteners configured to secure the system to a surface. The casing body consists of a single piece.

According to some embodiments, the system is configured to be secured onto a surface of any orientation.

According to some embodiments, the system is configured to be secured at any orientation thereof.

According to some embodiments, the casing body is integrally formed.

According to some embodiments, the casing body is integrally formed by pressing. Certain embodiments of the present disclosure may include some, all, or none of the above advantages. One or more other technical advantages may be readily apparent to those skilled in the art from the figures, descriptions, and claims included herein. Moreover, while specific advantages have been enumerated above, various embodiments may include all, some, or none of the enumerated advantages.

Unless otherwise defined, all technical and scientific terms used herein have the same meaning as commonly understood by one of ordinary skill in the art to which this disclosure pertains. In case of conflict, the patent specification, including definitions, governs. As used herein, the indefinite articles "a" and "an" mean "at least one" or "one or more" unless the context clearly dictates otherwise.

BRIEF DESCRIPTION OF THE FIGURES

Some embodiments of the disclosure are described herein with reference to the accompanying figures. The description, together with the figures, makes apparent to a person having ordinary skill in the art ("the skilled person") how some embodiments may be practiced. The figures are for the purpose of illustrative description and no attempt is made to show structural details of an embodiment in more detail than is necessary for a fundamental understanding of the disclosure. For the sake of clarity, some objects depicted in the figures are not to scale.

In the figures:

FIG. 3A is a perspective, front, cross-sectional view of an NBC filtration system including the casing of FIG. 1A and the NBC filter of FIG. 2A accommodated within the casing, according to some embodiments;

FIG. 3B is a perspective, side, cross-sectional view of the NBC filtration system of FIG. 3A, according to some embodiments;

DETAILED DESCRIPTION

Figure 1A:
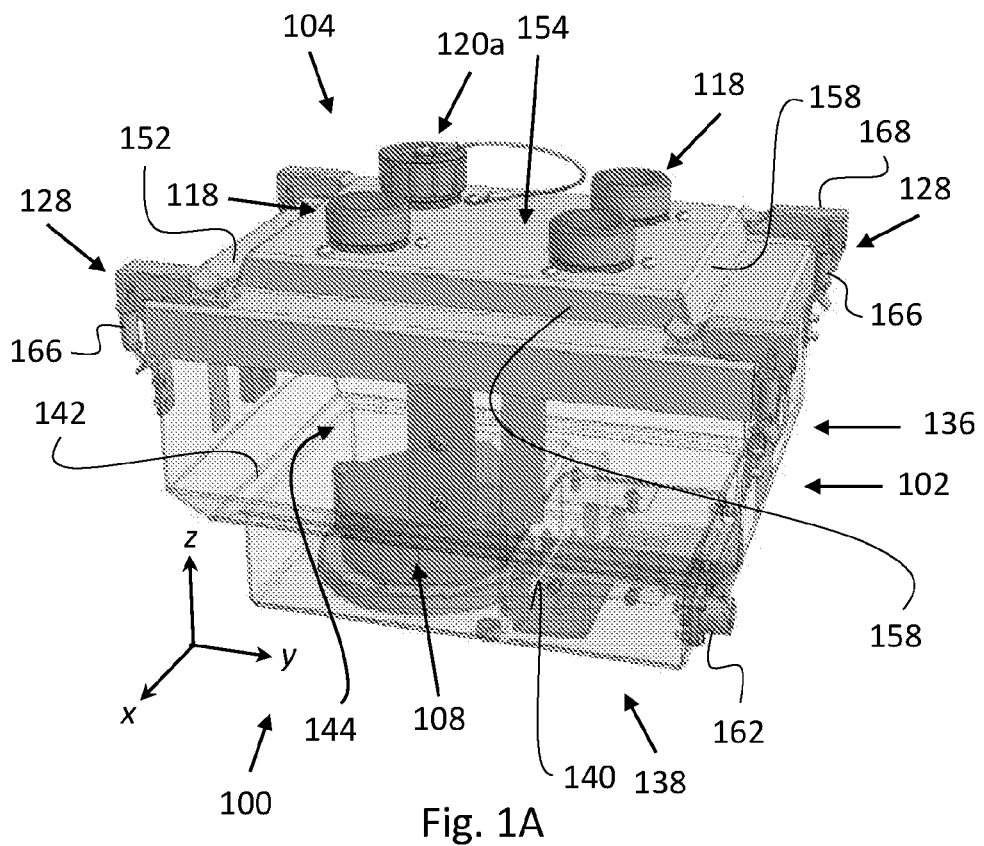
FIG. 1A is a perspective, front view from above of a casing of an NBC filtration system, the casing including a casing body, a lid, and a blower housed in the casing body, according to some embodiments.

The principles, uses, and implementations of the teachings herein may be better understood with reference to the accompanying description and figures. Upon perusal of the description and figures present herein, one skilled in the art will be able to implement the teachings herein without undue effort or experimentation. In the figures, same reference numerals refer to same parts throughout.

In the description and claims of the application, the words "include" and "have", and forms thereof, are not limited to members in a list with which the words may be associated.

As used herein, the term "about" may be used to specify a value of a quantity or parameter (e.g. the length of an element) to within a continuous range of values in the neighborhood of (and including) a given (stated) value. According to some embodiments, "about" may specify the value of a parameter to be between 80% and 120% of the given value. For example, the statement "the length of the element is equal to about 1 m" is equivalent to the statement "the length of the element is between 0.8 m and 1.2 m". According to some embodiments, "about" may specify the value of a parameter to be between 90% and 110% of the given value. According to some embodiments, "about" may specify the value of a parameter to be between 95% and 105% of the given value.

As used herein, according to some embodiments, the terms "substantially" and "about" may be interchangeable.

As used herein, according to some embodiments, the term "slightly smaller than", with reference to the values of two parameters, may specify the value of the first (i.e. the smaller parameter) parameter to be smaller than that of the second parameter by no more than 20% of the value of the second parameter. Thus, for example, the statement "a is slightly smaller than b" is equivalent to the statement "0.8·b≤a<b". According to some embodiments, the term "slightly smaller than" may specify the value of the first parameter to be smaller than that of the second parameter by no more than 10% of the value of the second parameter. According to some embodiments, the term "slightly smaller than" may specify the value of the first parameter to be smaller than that of the second parameter by no more than 5% of the value of the second parameter.

For ease of description, in some of the figures a three-dimensional cartesian coordinate system (with orthogonal axes x, y, and z) is introduced. It is noted that the orientation of the coordinate system relative to a depicted object may vary from one figure to another.

The term "nuclear, biological, chemical" (NBC), with reference to NBC filtration systems, filters, and the like, is used throughout the present application in a broad sense, meaning at least one of radiological, nuclear, biological, and chemical. Accordingly, an NBC filter may refer, for example, to a filter providing protection against biological and chemical agents, but no protection or only partial protection against nuclear agents, or a filter providing protection against nuclear and chemical agents, but no protection or only partial protection against biological agents, and so on.

Figure 1B:
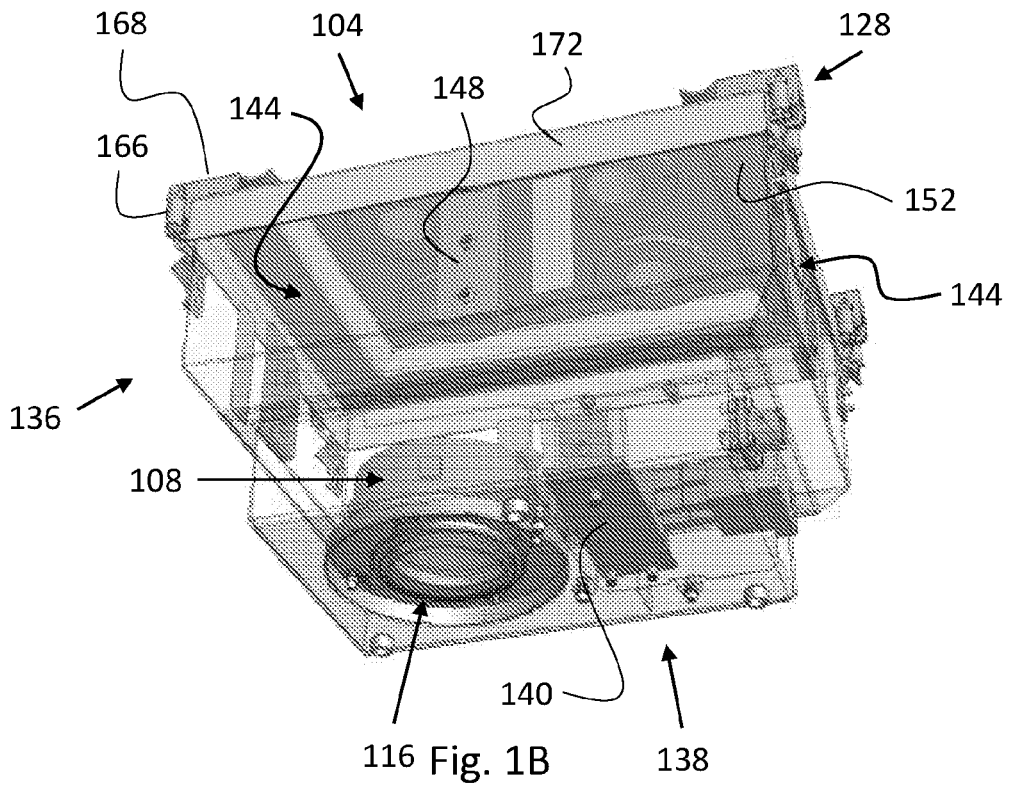
FIG. 1B is a perspective, front view from below of the casing of FIG. 1A, according to some embodiments.
Figure 1C:
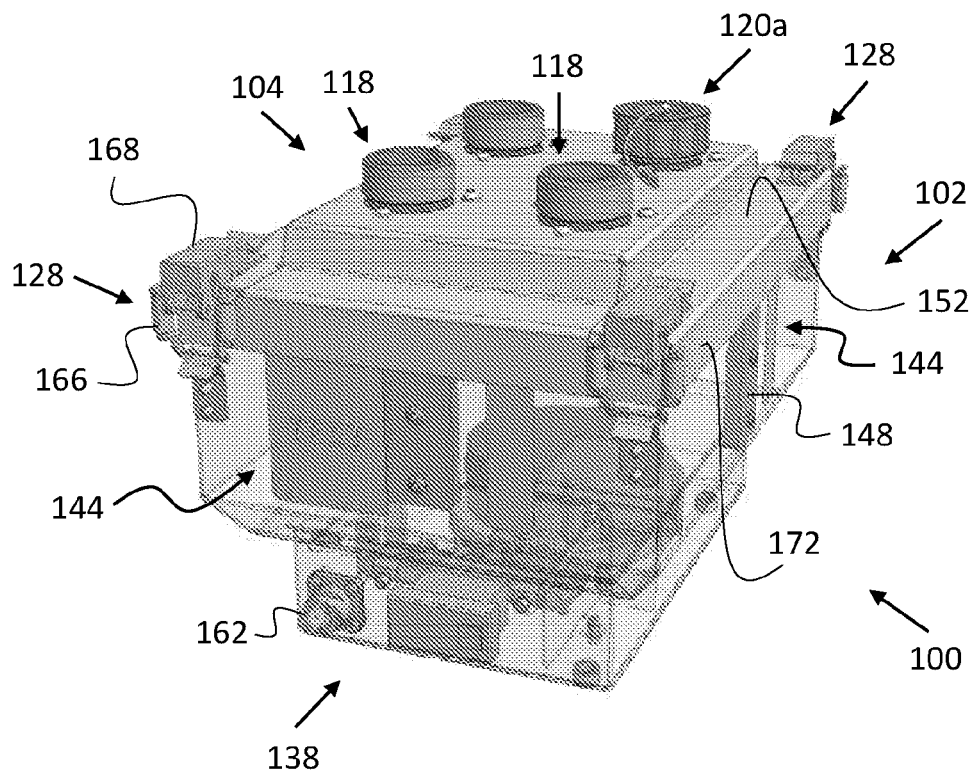
FIG. 1C is a perspective, side view from above of the casing of FIG. 1A, according to some embodiments.
Figure 1D:
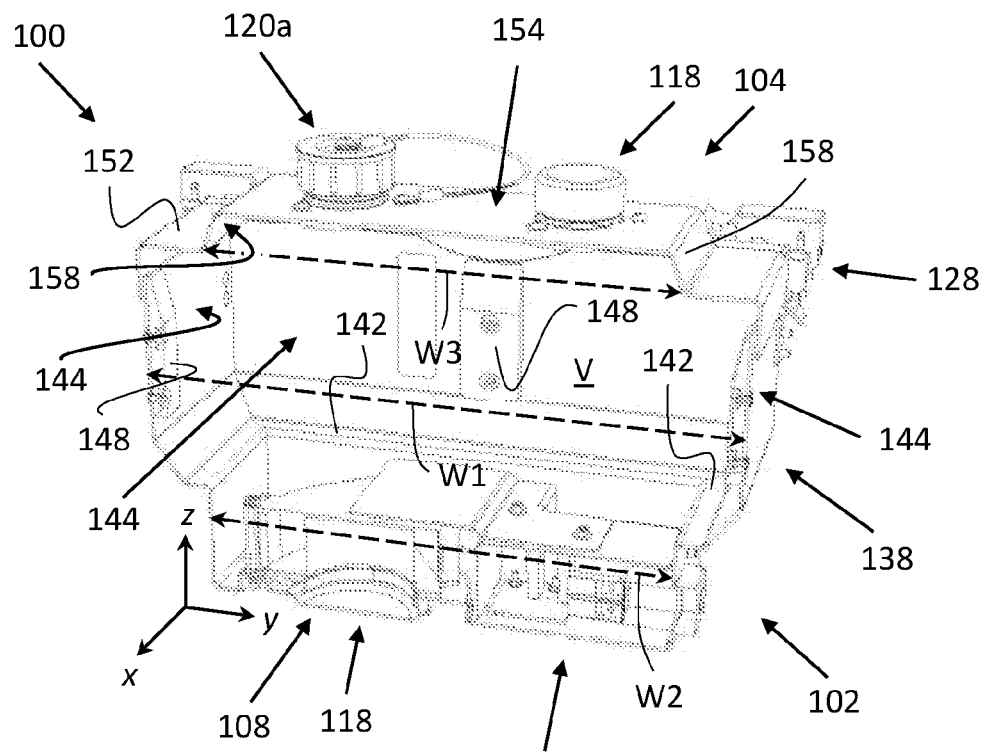
FIG. 1D is a perspective, front, cross-sectional view of the casing of FIG. 1A, according to some embodiments.

FIGS. 1A-1D schematically depict a casing 100 for a radiological, nuclear, biological, and chemical (NBC) filtration system, according to some embodiments. Casing 100 is configured to accommodate therein an NBC filter, as described below. FIGS. 1A and 1B are perspective front views of casing 100 from a vantage point higher and lower than casing 100, respectively. FIG. 1C is a perspective, side view of casing 100. FIG. 1D is a perspective, front, cross-sectional view of casing 100. Casing 100 includes a casing body 102, a lid 104, and a blower 108 housed within casing body 102. To facilitate the description, casing body 102 is depicted in FIGS. 1A-1C, 1E, and 3C as semi-transparent.

Casing body 102 includes an inlet port 116 fluidly connected to blower 108 (e.g. a compressor). According to some embodiments, inlet port 116 is fluidly coupled to a suction port of blower 108. Lid 104 includes a plurality of outlet ports 118 (for example, four, as depicted in the figures). Each of outlet ports 118 may be configured to be selectively opened to a protected space and/or to be connected to an air-duct (not shown) of a facepiece (e.g. a gas mask). When not in use, each of outlet ports 118 may be covered with a removable cap (e.g. a screw cap). In the figures, one of outlet ports 118, an outlet port 118a, is shown with a cap 120a fitted thereon.

Figure 1E:
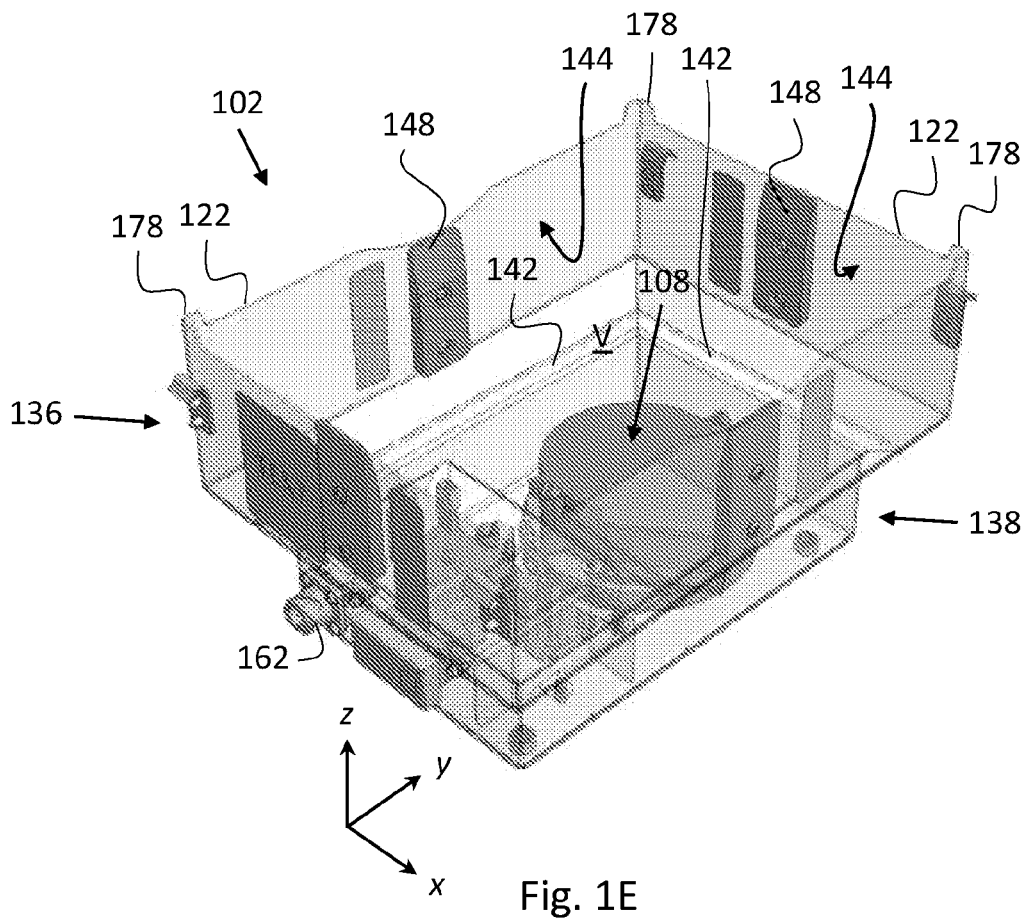
FIG. 1E is a perspective view from above of the casing of FIG. 1A with the lid removed, according to some embodiments.
Figure 1F:
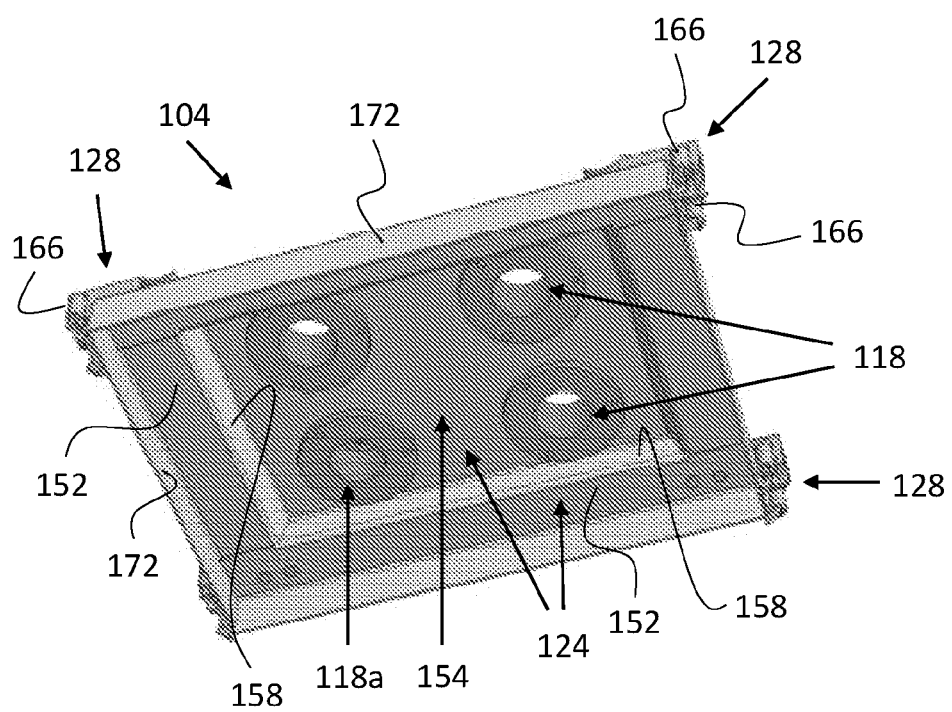
FIG. 1F is a perspective view from below of the lid of FIG. 1A, according to some embodiments.

Making reference also to FIGS. 1E and 1F, FIG. 1E schematically depicts casing 100 with lid 104 removed. FIG. 1F schematically depicts lid 104, according to some embodiments. Casing body 102 is hollow, defining an inner volume V therein, as specified below. Casing body 102 is open from above and includes a casing rim 122 (at the top end thereof). In FIGS. 1A-1D, lid 104 is shown shut (closed), that is, mounted on raised corners 178 of casing rim 122 (indicated in FIG. 1E) such as to close casing body 102 from above in a ventilated manner. An inner surface 124 of lid 104 is shown in FIG. 1F.

One or more coupling elements 128 (for example, four, as depicted in the figures) are configured to mechanically secure lid 104 to casing body 102, as elaborated on below.

According to some embodiments, casing body 102 includes an upper (first) section 136 and a lower (second) section 138 adjacent to upper section 136 and positioned below thereto. According to some embodiments, upper section 136 defines inner volume V. Upper section 136 is configured to accommodate an NBC filter (such as the NBC filter of FIGS. 2A-2C), as elaborated on below. Lower section 138 includes inlet port 116 and houses blower 108.

According to some embodiments, casing body 102 includes a peripheral first ledge 142 (e.g. a shelf). First ledge 142 projects inwardly from sidewalls 144 of casing body 102 and is configured to support an NBC filter, as elaborated on below. According to some embodiments, first ledge 142 is shaped as a seat, so that the lateral (parallel to the xy-plane) area defined by lower section 138 is smaller than the lateral area defined by upper section 136. That is, the lateral cross-section of lower section 138, is smaller than the lateral cross-section of upper section 136. According to some embodiments, sidewalls 144 include spacers 148, the function of which is explained below.

According to some embodiments, lid 104 includes a peripheral second ledge 152. Second ledge 152 extends around a central portion 154 of lid 104. Central portion 154 includes outlet ports 118 and may be raised relative to second ledge 152, being connected thereto via lid (central) sidewalls 158. According to some embodiments, the area of central portion 154 is smaller than the area defined by upper section 136 (the lateral cross-section of upper section 136). According to some such embodiments, the area of central portion 154 is equal or about equal to the area defined by lower section 138 (the lateral cross-section of lower section 138). The function of second ledge 152 is explained below.

According to some embodiments, lower section 138 includes a power socket 162 electrically coupled to blower 108 and configured to be connected to an external power source (e.g. to a vehicle's electrical system). Lower section 138 may further include an electrical switch (e.g. a toggle switch or a push-button; not shown) for switching on and off blower 108.

According to some embodiments, lower section 138 includes a printed circuit board (PCB) 140. PCB 140 may include one or more of electromagnetic interference (EMI) reduction for the motor (not shown) of blower 108, polarity protection, NBC detection sensors, a pressure sensor to verify blower 108 operation, a clogged filter indicator, one or more LEDs for visual indication of a fault condition(s), and so on.

Blower 108 is configured to force air into casing body 102 via inlet port 116, such as to create and maintain positive-pressure environments within casing 100, as elaborated on below, and as known in the art of NBC filtrations systems. According to some embodiments, blower 108 includes a centrifugal fan (not shown) configured to force air into lower section 138. According to some embodiments, blower 108 includes a labyrinth structure (not indicated) configured to prevent liquid droplets from entering through blower 108 into lower section 138.

According to some embodiments, casing body 102 includes one or more fasteners (e.g. bracket joints or hooks; not shown) configured to allow detachably securing casing 100 (particularly, with an NBC filter affixed therein) to a surface (e.g. a wall). According to some embodiments, casing 100 can be mounted at any orientation (angle) and/or on a surface of any orientation. For example, casing 100 may be attached upside down to the ceiling of the passenger cabin of a vehicle (i.e. with lid 104 being positioned below casing body 102).

According to some embodiments, casing body 102 may be made of a metallic material, a plastic, a glass reinforced plastic, a carbon fiber reinforced plastic, a composite material, etc. According to some embodiments, casing body 102 is integrally formed, e.g. by pressing, thereby potentially simplifying the manufacturing process of casing body 102 and reducing the cost thereof, as well as potentially increasing the durability of casing body 102.

Figure 2A:
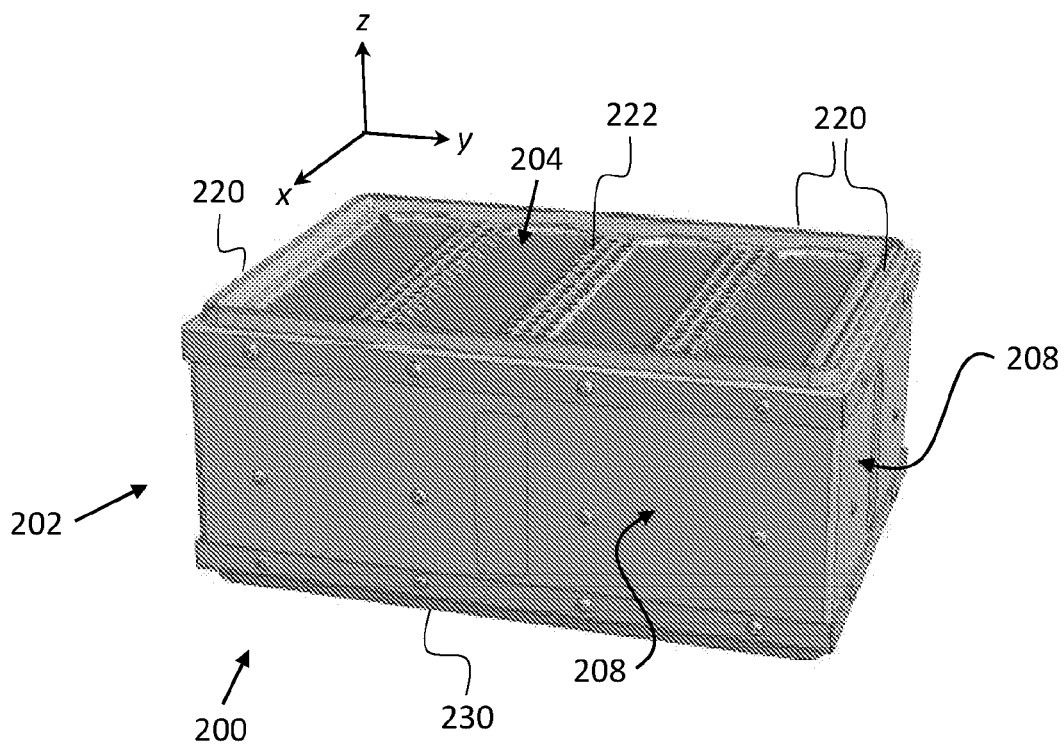
FIG. 2A is a perspective view from above of an NBC filter configured to be accommodated within the casing of FIG. 1A, according to some embodiments.
Figure 2B:
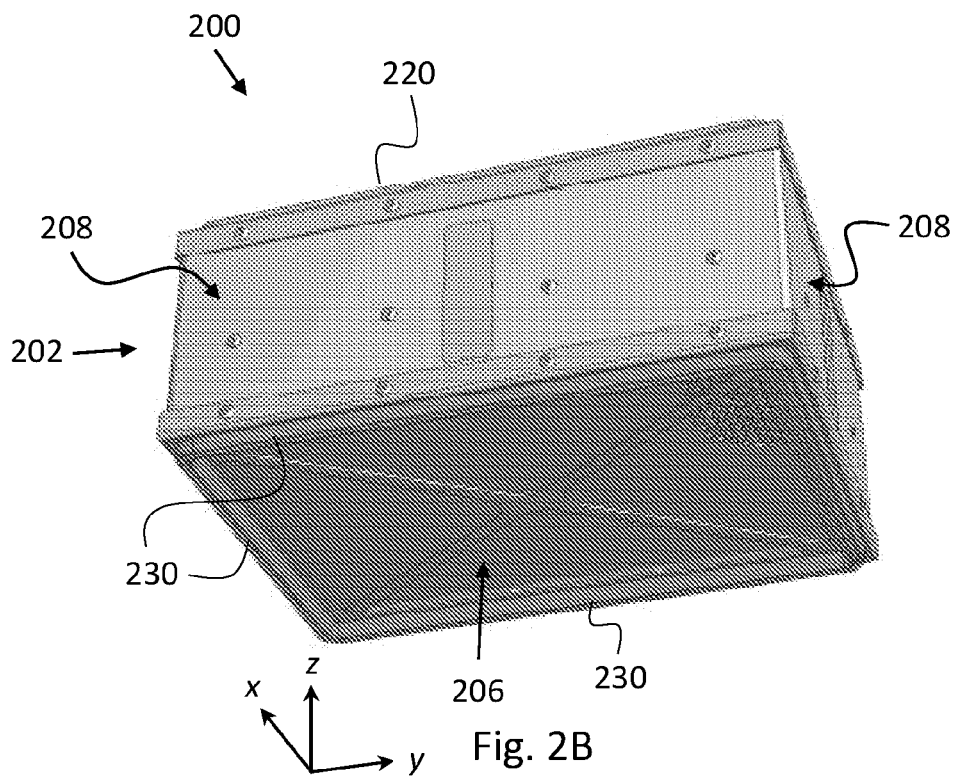
FIG. 2B is a perspective view from below of the NBC filter of FIG. 2A, according to some embodiments.

FIGS. 2A and 2B schematically depict an NBC filter 200, according to some embodiments. FIGS. 2A and 2B are perspective front views of NBC filter 200 from a vantage point higher and lower than NBC filter 200, respectively. NBC filter 200 is configured to be accommodated in casing 100, as elaborated on below. NBC filter 200 includes a filter housing 202 including a filter top face 204 (shown in FIG. 2A), a filter bottom face 206 (shown in FIG. 2B) opposite to filter top face 204, and filter sidewalls 208 (for example, four in the figures, wherein NBC filter 200 is substantially shaped as a rectangular box) extending from filter bottom face 206 to filter top face 204. According to some embodiments, wherein NBC filter 200 is substantially shaped as a rectangular box, NBC filter 200 may measure between 20 cm to 30 cm in width, between 15 cm to 20 cm in depth, and between 7.5 cm to 15 cm in height (for example, 25 cm in width, 17 cm in depth, and 10 cm in height).

The skilled person will understand that the scope of the disclosure also covers other shapes of casings and NBC filters (beyond cuboid). For example, the casing and/or the NBC filter(s) may be cylindrical. Some of these options are described in FIGS. 5A-6C and in the accompanying descriptions thereof.

Filter bottom face 206 may be perforated, to serve as an inlet, or may include a filter inlet (not indicated). Similarly, filter top face 204 may be perforated to serve as an outlet or may include a filter outlet (not indicated). According to some embodiments, filter housing 202 includes a particulate filter and/or an (active) adsorption carbon filter. According to some embodiments, the particulate filter is a high-efficiency particulate air (HEPA) filter configured to remove (from a gas, e.g. air, passing therethrough) at least 99.7% of particles having a size of 0.3 μm (micro-meter) or greater.

Filter top face 204 includes a first seal 220 (e.g. a gasket) disposed along the perimeter (not numbered) of filter top face 204. In particular, first seal 220 surrounds the filter outlet. First seal 220 forms a bulge projecting in the upwards direction (i.e. in the direction of the positive z-axis) from filter top face 204. According to some embodiments, filter top face 204 includes a perforated grille 222 (e.g. perforated surface) mounted thereon, and serving as an outlet. According to some such embodiments, first seal 220 is disposed along the perimeter of grille 222. The function of first seal 220 is explained below.

According to some embodiments, and as depicted in the figures, NBC filter 200 additionally includes a second seal 230, which may be similar to first seal 220. More specifically, second seal 230 may be disposed along the perimeter (not numbered) of filter bottom face 206 such as to form a bulge projecting in the downwards direction (i.e. in the direction of the negative z-axis) from filter bottom face 206. In particular, second seal 230 surrounds the filter inlet. The function of second seal 230 is explained below.

According to some embodiments, first seal 220 and/or second seal 230 are made of an elastomeric material, such as rubber, which is chemically resistant. According to some embodiments, the material is or includes ethylene propylene diene monomer (EPDM) rubber, neoprene, and/or the like. According to some embodiments, first seal 220 and/or second seal 230 are double-lipped.

Figure 3C:
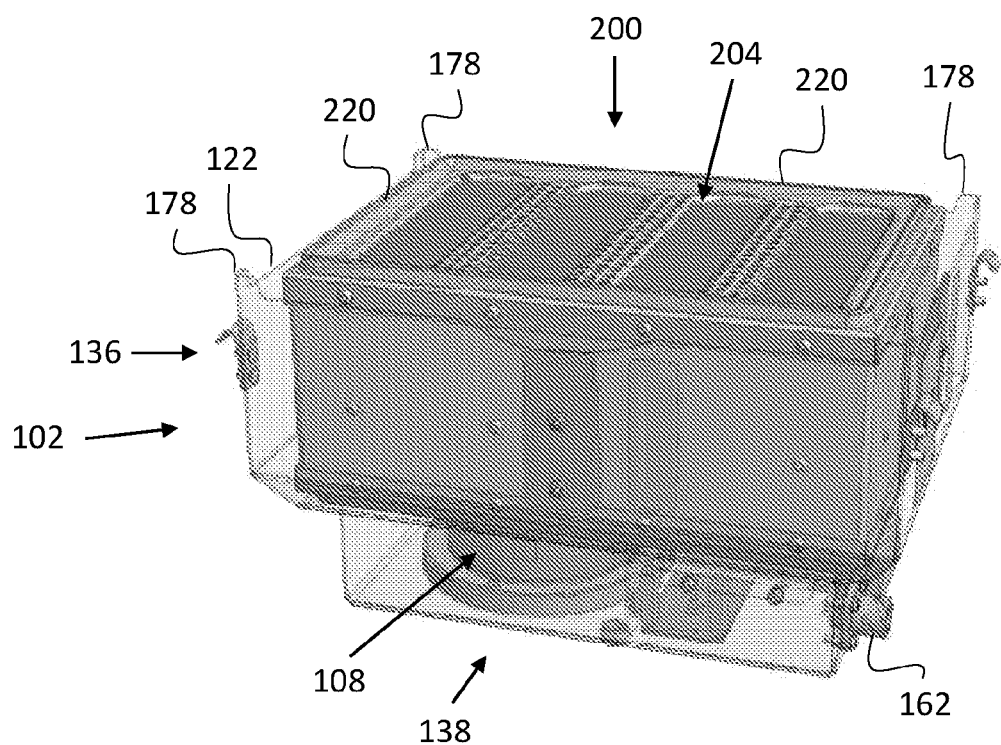
FIG. 3C is a perspective view from above of the NBC filtration system of FIG. 3A with the lid removed, according to some embodiments.

FIGS. 3A-3C schematically depict an NBC filtration system 300 including casing 100 and NBC filter 200 (accommodated within casing 100). FIG. 3A is a perspective, front, cross-sectional view of NBC filtration system 300. FIG. 3B is a perspective, side, cross-sectional view of NBC filtration system 300. NBC filter 200 is configured to be accommodated in upper section 136 of casing body 102. According to some embodiments, and as seen in FIGS. 3A and 3B, NBC filter 200 is supported within casing body 102 by first ledge 142.

Casing 100 and NBC filter 200 are configured such that, when NBC filter 200 is affixed in casing body 102, filter top face 204 and lid 104 define an outlet compartment 302 therebetween. More specifically, outlet compartment 302 fluidly couples the filter outlet (of NBC filter 200) to outlet ports 118 but is otherwise fluidly sealed (when lid 104 is securely closed) by first seal 220, which is sandwiched between filter top face 204 and inner surface 124 (of lid 104). According to some embodiments, wherein lid 104 includes second ledge 152, when lid 104 is closed, first seal 220 is sandwiched between filter top surface 204 and second ledge 152. Due to the fluid-sealing provided by first seal 220, in operation (i.e. when NBC filtration system 300 is in use), any air entering outlet compartment 302 enters therein via the filter outlet and is therefore purified, and, consequently, any air entering outlet ports 118 is purified.

Coupling elements 128 are configured to enable the above-described fluid-sealing of outlet compartment 302 by pushing lid 104 against NBC filter 200, such as to press first seal 220 (thereby ensuring the above-described fluid-sealing of outlet compartment 302). Coupling elements 128 may be spring-based, including springs 166 (FIG. 1C) for example, as depicted in the figures, each of coupling elements 128 includes two springs and locking means configured to lock coupling elements 128. For example, spring-loaded draw/toggle-latches may be used. According to some embodiments, the locking means may be levers, such as levers 168, grips, or the like.

A potential advantage offered by such spring-based mechanisms is that no adjustment or fine-tuning is required by a user in order to lock coupling elements 128, as may potentially be required when using a screw-based mechanism. Moreover, the locking of coupling elements 128 provides visual indication that lid 104 is securely closed and outlet compartment 302 is fluidly sealed (in the sense explained above). In particular, a state in which one or more of coupling elements 128 is unlocked (and outlet compartment 302 is unsealed), may be easily distinguishable by an unaided eye from the state in which coupling elements 128 are all locked (and outlet compartment 302 is fluidly sealed), since, when unlocked, the lever (from levers 168) of the coupling element is at least slightly raised. Consequently, the occurrence of a faulty sealing of casing 100 (following placement of NBC filter 200 therein) may thereby be reduced. Further, a spring-based mechanism is self-adjusting, and may be configured to ensure that the amount of pressure applied on first seal 220 is not too great nor too little (again without any fine-tuning required on the part of the user), thereby potentially increasing the usability of NBC filtration system 300.

According to some embodiments, not depicted in the figures, coupling elements 128 may be screw-based. The skilled person will understand that other options may apply.

According to some embodiments, blower 108 is fluidly coupled to the filter inlet (of NBC filter 200) via lower section 138 (and potentially via a bottom portion of upper section 136). That is, blower 108 and the filter inlet are physically separated such that a gap (not indicated) is present therebetween.

When NBC filter 200 is accommodated within casing body 102, filter bottom face 206 closes lower section from above such as to define an inlet compartment 304 in lower section 138 (and potentially also in a bottom portion of upper section 136).

According to some embodiments, wherein NBC filter 200 includes second seal 230, casing 100 and NBC filter 200 are configured such that, when NBC filter 200 is accommodated within casing body 102 and lid 104 is securely closed, inlet compartment 304 fluidly couples blower 108 to the filter inlet, but is otherwise fluidly sealed by second seal 230. According to some embodiments, and as depicted in FIGS. 3A and 3B, second seal 230 is sandwiched between first ledge 142 and filter bottom face 206.

The widths (dimensions along the y-axis) of upper section 136, lower section 138, and central portion 154 are indicated in FIGS. 1D and 3A by double-headed, dashed arrows W1, W2, and W3, respectively. The depths (dimensions along the x-axis) of upper section 136, lower section 138, and central portion 154 are indicated in FIG. 3B by double-headed, dashed arrows D1, D2, and D3, respectively. According to some embodiments, the lateral cross-section of inlet compartment 304 is defined by that of lower section 138 and the lateral cross-section of outlet compartment 302 is defined by that of central portion 152. According to some embodiments, W1≥W2, W3≈W2, D1≥D2, and D3≈D2, so that the lateral cross-section of upper section 136 (i.e. the lateral area of inner volume V) is greater than both the cross-section of inlet compartment 304 and the cross-section of outlet compartment 302, which are equal or substantially equal to one another. According to some embodiments, W1 is greater than each of W2 and W3 by about 20%, and D1 is greater than each of D2 and D3 by about 20%. For example, according to some embodiments (wherein there are four of outlet ports 118), the width and depth of NBC filter 200 measure about 25 cm and 17 cm, respectively, W1 may equal about 28 cm, W2 and W3 may each equal about 22.5 cm, D1 may equals about 20.5 cm, and D2 and D3 may equal about 17 cm.

Blower 108 may be configured to force air into casing body 102 (via inlet port 116), such as to create and maintain positive-pressure environments in inlet compartment 304 and outlet compartment 302 (i.e. such that the pressures within inlet compartment 304 and outlet compartment 302 are greater than outside casing 100).

It is noted that, in embodiments including second seal 230, a space S (FIGS. 3A, 3B) between filter sidewalls 208 and sidewalls 144 (and potentially vertical edges 172 of lid 104)—the space S surrounding NBC filter 200—is fluidly disconnected from both outlet compartment 302 by first seal 220 and from inlet compartment 304 by second seal 230.

Further, the space S is ventilated to the atmosphere, e.g. by perforations (not shown) on sidewalls 144 and/or by the existence of gaps between rim 122 and lid 104 (when lid 104 is closed) due to rim 122 including raised corners 178 (shown in FIGS. 1E and 3C) which support lid 104. This ventilation helps to ensure that no forced or pressurized potentially contaminated air may reach first seal 220 via space S, so that in the event of a failure of first seal 220, positive pressure applied by blower 108 still offers protection, since the only over-pressurized (i.e. above atmospheric pressure) air to reach outlet ports 118, is purified air which has passed via NBC filter 200 (as second seal 230 prevents over-pressurized air, which has been forced into inlet compartment 304 by blower 108, from penetrating space S).

According to some embodiments, the lateral cross-section of inlet compartment 304 is equal to or slightly smaller than the area defined by (i.e. enclosed by) second seal 230. According to some embodiments, the lateral cross-section of outlet compartment 302 is equal to slightly smaller than the area defined by first seal 220.

FIG. 3C is a perspective view of NBC filtration system 300 with lid 104 removed, so that NBC filter 200, and in particular filter top face 204, are visible.

According to some embodiments, not depicted in the figures, NBC filtration system 300 includes a dust separator. The dust separator is configured to remove large/coarse particles from the air entering blower 108.

The skilled person will understand that the sealing components may be mounted in casing 100 instead of being mounted on NBC filter 200. Thus, according to some embodiments, not depicted in the figures, alternatively (or additionally) to first seal 220, a seal may be affixed (attached) to inner surface 124 (e.g. on second ledge 152) of lid 104, such as to effect the above-described fluid-sealing of outlet compartment 302. Similarly, according to some embodiments, not depicted in the figures, alternatively (or additionally) to second seal 230, a seal may be affixed to first ledge 142, such as to effect the above-described fluid-sealing of lower section 138.

Figure 4A:
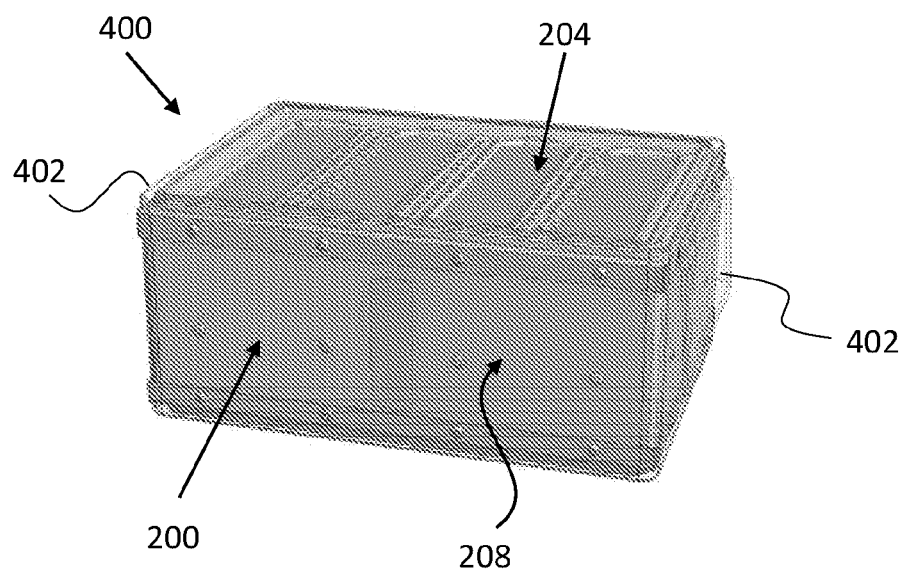
FIG. 4A is a perspective view of a wrapped NBC filter including the NBC filter of FIG. 2A sealed in an air-proof wrapping, according to some embodiments.

Prior to use, an NBC filter must be kept fluidly sealed, e.g. in an air and moisture proof wrapping or box, to prevent the carbon filter from absorbing humidity. FIG. 4A schematically depicts a wrapped NBC filter 400, according to some embodiments.

Figure 4B:
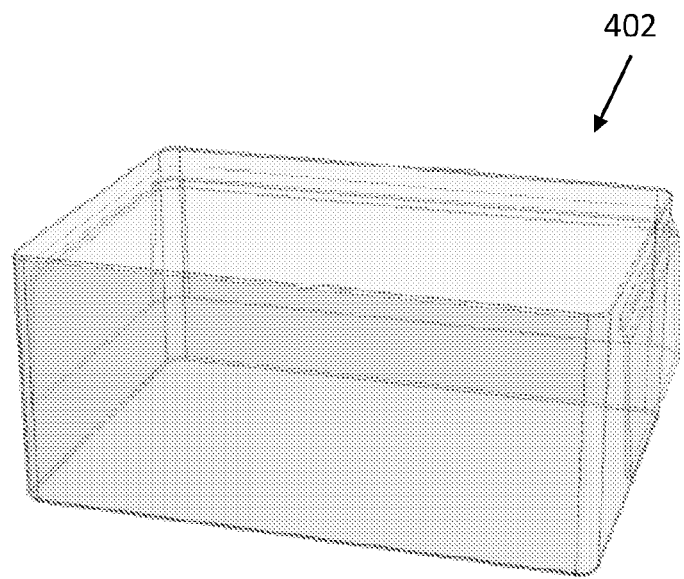
FIG. 4B is a perspective view of the wrapping of FIG. 4A, according to some embodiments.

Wrapped NBC filter 400 includes NBC filter 200 and an air-proof and moisture-proof wrapping 402 which fully covers NBC filter 200 such as to fluidly seal NBC filter 200. To facilitate the description, wrapping 402 is depicted as semi-transparent. FIG. 4b schematically depicts wrapping 402. Wrapping 402 may be or may include an aluminum foil. According to some embodiments, wrapping includes a laminate of a polymeric layer, e.g. PVC, coated by aluminum.

According to some embodiments, casing 100 and wrapping 402 are configured such as to allow accommodating wrapped NBC filter 400 within casing 100, thereby affording the option of storing wrapped NBC filter 400 inside casing 100 prior to use.

Figure 4C:
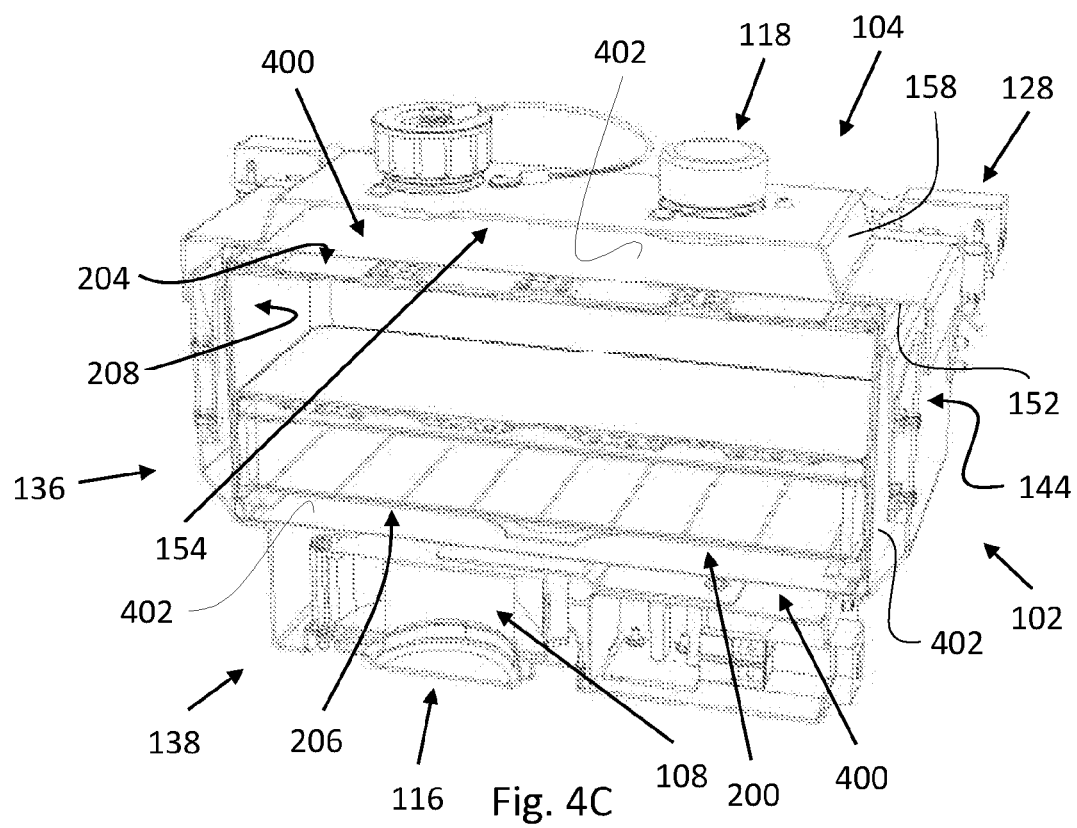
FIG. 4C is a perspective, front, cross-sectional view of the wrapped NBC filter of FIG. 4A accommodated within the casing of FIG. 1A, according to some embodiments.

FIG. 4C schematically depicts wrapped NBC filter 400, accommodated within casing 100. More specifically, FIG. 4C is a perspective, front, cross-sectional view of casing 100 with wrapped NBC filter 400 accommodated therein. Lid 104 is securely closed and coupling elements 128 are locked. Despite wrapped NBC filter 400 being of slightly greater dimensions than NBC filter 200, coupling elements 128 may be configured to allow the locking thereof also when wrapped NBC filter 400 is accommodated in casing 100. When coupling elements 128 are self-adjusting as described above, e.g. when coupling elements 128 are spring-based, coupling elements 128 may automatically adjust to the slightly increased dimensions of wrapped NBC filter 400 (as compared to NBC filter 200) with no action to this end being required of the user. In particular, wrapped NBC filter 400 is securely held within casing 100, e.g. being sandwiched between first ledge 142 and lid 104 (and, more specifically, second ledge 152 in embodiments wherein lid 104 includes second ledge 152), which press on wrapped NBC filter 400 from below and above, respectively. Casing 100 thus affords protected storage space for wrapped NBC filter 400, which may be especially advantageous in restricted spaces, such as within a combat vehicle.

Figure 5A:
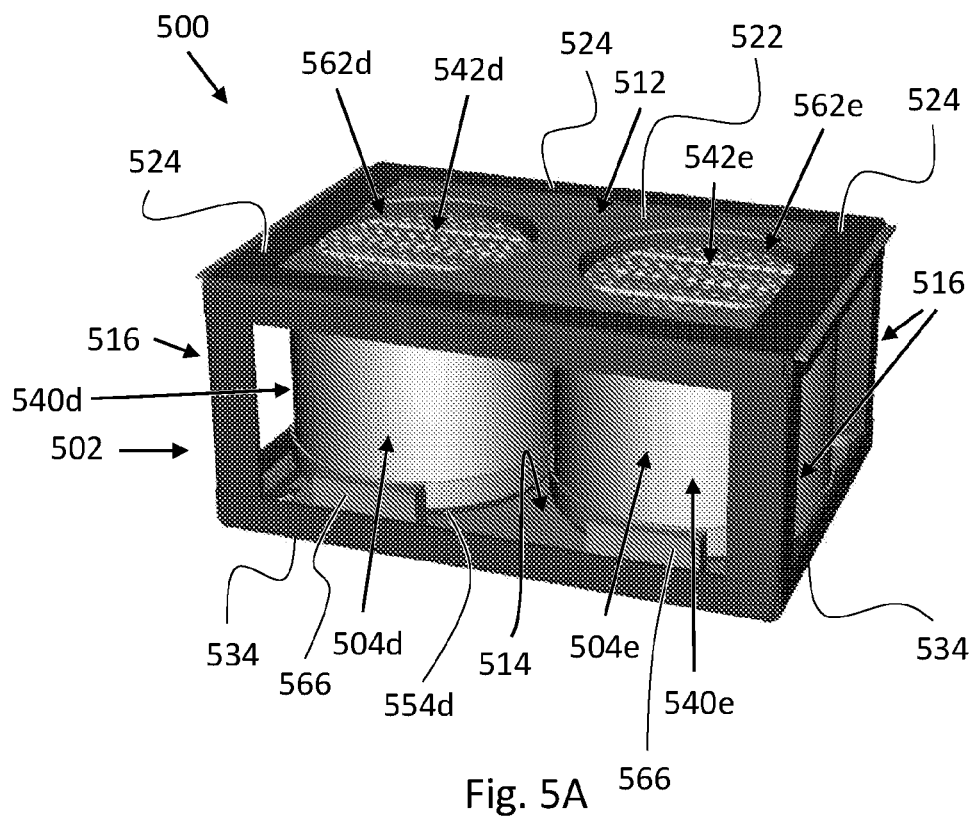
FIG. 5A is a perspective view from above of an NBC filter assembly including a frame housing a pair of NBC filters, the NBC filter assembly being configured to be accommodated within the casing of FIG. 1A, according to some embodiments.

According to an aspect of some embodiments, casing 100 is configured to accommodate a plurality of NBC filters. According some such embodiments, the plurality of NBC filters may be fitted in (held in) a frame, as described below. There is thus provided an NBC filter assembly which includes a plurality of NBC filters and which is configured to be accommodated within casing 100 or a casing similar thereto, as elaborated on below. FIG. 5A schematically depicts such an NBC filter assembly 500, according to some embodiments. More specifically, FIG. 5A is a perspective front view of NBC filter assembly 500 from a vantage point higher than NBC filter assembly 500. NBC filter assembly 500 includes a frame 502 and a pair of NBC filters 504: a first NBC filter 504d and a second NBC filter 504e. NBC filters 504 are mounted within frame 502, as explained below. According to some embodiments, and as depicted in the figures, NBC filters 504 are cylindrical. According to some such embodiments, NBC filters 504 are standard NATO 1 filters, or similar thereto. According to some embodiments, each of NBC filters 504 may be similar to NBC filter 200 but differs therefrom in being substantially shaped as a cylinder instead of as a rectangular box.

According to some embodiments, frame 502 includes a top plate 512, a bottom plate 514, and elongated, vertical support elements 516 (four in FIG. 5A) extending from the corners of bottom plate 514 to the corners of top plate 512. According to some embodiments, a top surface 522 of top plate 512 includes a (top) peripheral lining 524 extending along the periphery of top plate 512. Peripheral lining 524 may be made of an elastomeric material, such as rubber. Optionally, and as depicted in FIG. 5A, a bottom surface 532 of bottom plate 514 also includes a (bottom) peripheral lining 534, similar to peripheral lining 524, and extending along the periphery of bottom plate 514. The function of the peripheral linings is explained below.

Figure 5B:
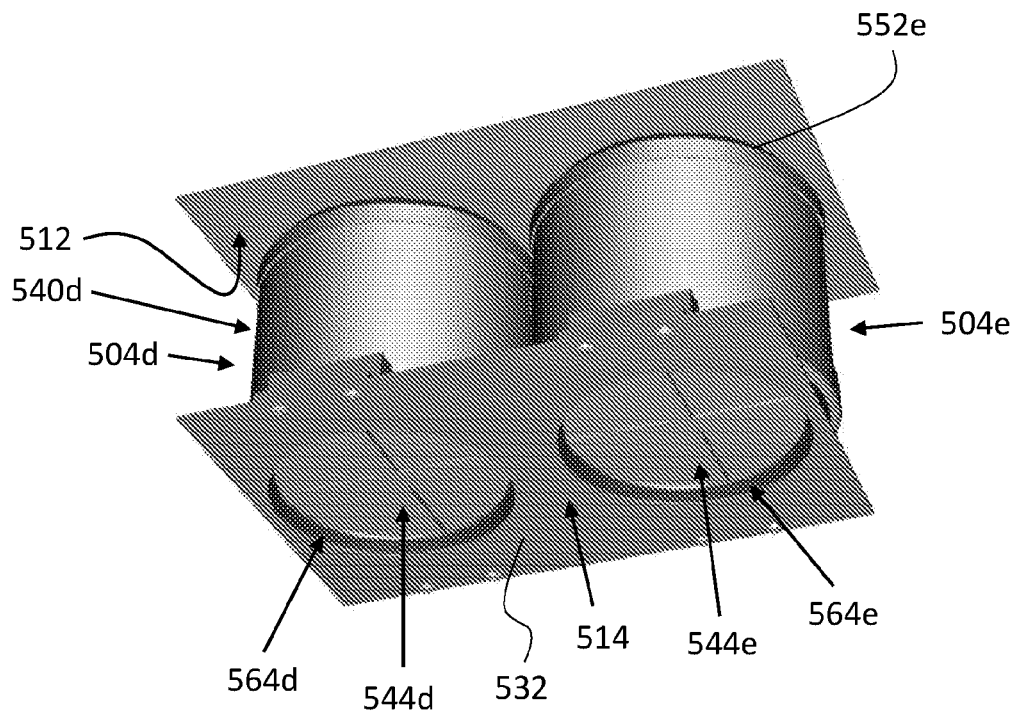
FIG. 5B is a perspective view from below of the pair of NBC filters of FIG. 5A with vertical support elements and a peripheral lining of the frame removed, such as to leave the pair of NBC filters sandwiched between two plates of the frame, according to some embodiments.

FIG. 5B schematically depicts NBC filter assembly 500 with vertical support elements 516 and peripheral linings 524 and 534 omitted (i.e. not shown), according to some embodiments. More specifically, FIG. 5B provides a perspective view from a vantage point lower than NBC filter assembly 500.

Figures 5C, 5D:
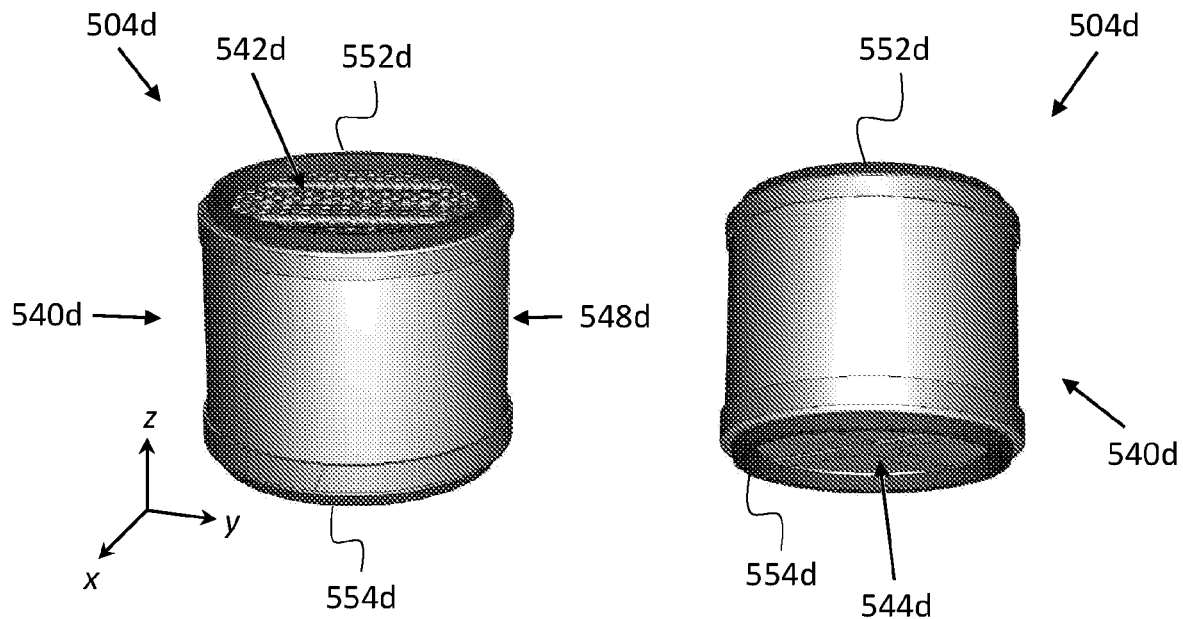
FIG. 5C is a perspective view from above of one of the pair of NBC filters of FIG. 5A, according to some embodiments.
FIG. 5D is a perspective view from below of the NBC filter of FIG. 5C, according to some embodiments.

FIGS. 5C and 5D schematically depicts first NBC filter 504d, according to some embodiments (but the following description will be understood to apply also to second NBC filter 504e). FIGS. 5C and 5D are perspective front views of first NBC filter 504d from a vantage point higher and lower than first NBC filter 504d, respectively. First NBC filter 504d includes a filter housing 540d including a filter top face 542d (shown in FIG. 5C), a filter bottom face 544d (shown in FIG. 5D), and a cylindrical filter sidewall 548d extending from filter bottom face 544d to filter top face 542d.

Filter bottom face 544d may be perforated, to serve as an inlet, or may include a filter inlet (not indicated). Similarly, filter top face 542d may be perforated to serve as an outlet or may include a filter outlet (not indicated).

Filter top face 542d includes an upper seal 552d (e.g. a gasket) disposed along the perimeter (not numbered) of filter top face 542d. Upper seal 552d may be similar to first seal 220, differing therefrom in being circular instead of rectangular. In particular, upper seal 552d surrounds the filter outlet and forms a bulge projecting in the upwards direction (i.e. in the direction of the positive z-axis) from filter top face 542d.

First NBC filter 504d may additionally include a lower seal 554d, which may be similar to upper seal 552d. More specifically, lower seal 554d may be disposed along the perimeter (not numbered) of filter bottom face 544d such as to surround the filter inlet and form a bulge projecting in the downwards direction from filter bottom face 544d.

According to some embodiments, upper seal 552d and/or lower seal 554d are made of an elastomeric material, such as rubber, which is chemically resistant.

Also indicated in the figures are a filter housing 540e, a filter top face 542e, a filter bottom face 544e, an upper seal 552e, and a lower seal 554e of second NBC filter 504e, which are essentially similar to filter housing 540d, filter top face 542d, filter bottom face 544d, filter sidewall 548d, upper seal 552d, and lower seal 554d of first NBC filter 504d.

Making reference again to FIGS. 5A and 5B, top plate 512 includes upper holes 562 (two in the figures) and bottom plate 514 includes lower holes 564 (two in the figures). Each of upper holes 562 is of a diameter slightly smaller than the diameter characterizing filter housings 540, and, in particular, slightly smaller than the diameter of upper seals 552. Similarly, each of lower holes 564 is of a diameter slightly smaller than the diameter characterizing filter housings 540, and, in particular, slightly smaller than the diameter of lower seals 554. NBC filters 504 are sandwiched between top plate 512 and bottom plate 514, with upper seals 552 being pressed between filter top faces 542, respectively, and top plate 512 (e.g. upper seal 552d is pressed between filter top face 542d and top plate 512), and lower seals 554 being pressed between bottom plate 514 and filter bottom faces 544, respectively (e.g. lower seal 554e is pressed between bottom plate 514 and filter bottom face 544e). More specifically, NBC filters 504 are sandwiched between top plate 512 and bottom plate 514 such that each lower hole-NBC filter-upper hole triplet is concentrically, or substantially concentrically, disposed, with the lower hole and the upper hole being fluidly connected via, and only via, the NBC filter. For example, a lower hole 564d (from lower holes 564), first NBC filter 504d, and an upper hole 562d (from upper holes 562) constitute such as a lower hole-NBC filter-upper hole triplet, with lower hole 564d and upper hole 562d being fluidly connected via, and only via, first NBC filter 504d.

Also indicated are members 566, which are disposed on the top face of bottom plate 514 and are configured to secure NBC filters 504 within frame 502.

Figure 5E:
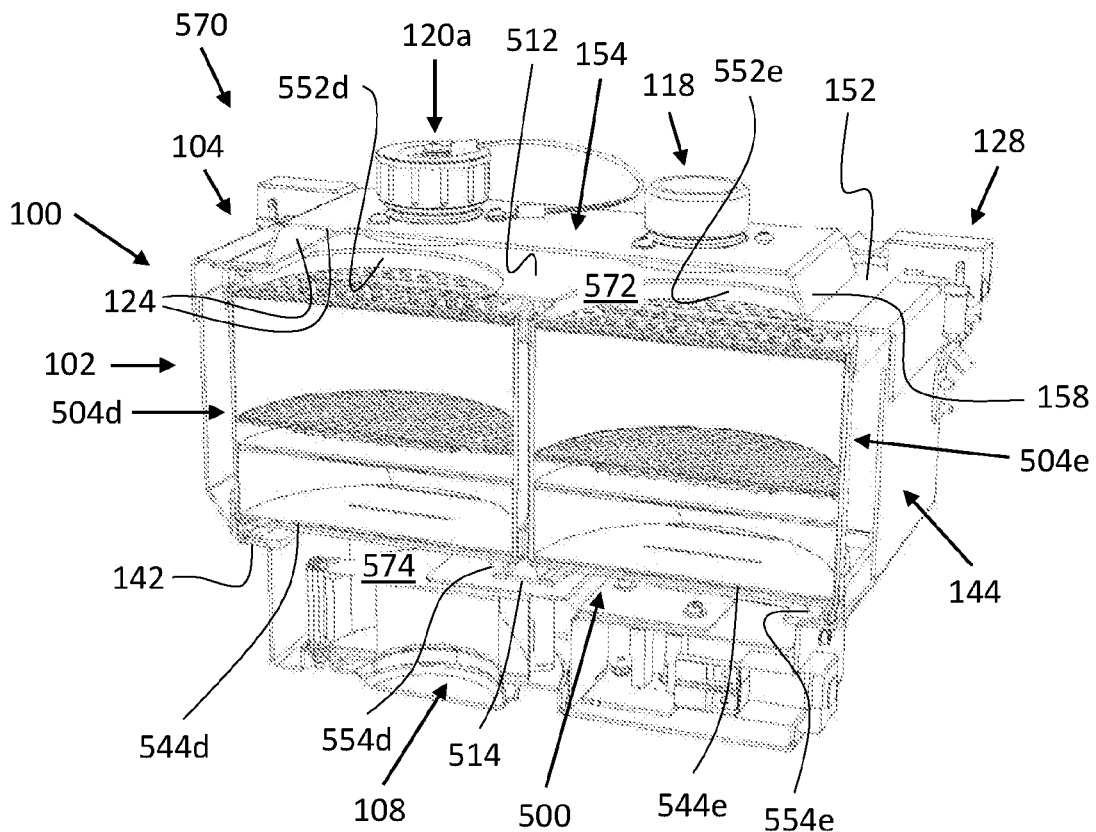
FIG. 5E is a perspective, front, cross-sectional view of an NBC filtration system including the casing of FIG. 1A and the NBC filter assembly of FIG. 5A accommodated within the casing, according to some embodiments.

FIG. 5E schematically depict an NBC filtration system 570 including casing 100 and NBC filter assembly 500 (affixed within casing 100). More specifically, FIG. 5E is a perspective, front, cross-sectional view of NBC filtration system 570.

NBC filter assembly 500 is supported (within casing body 102) by first ledge 142. As seen in FIG. 5E, the accommodation within casing 100 of NBC filter assembly 500 is such as to define an outlet compartment 572 between top plate 512 and inner surface 124 when lid 104 is securely closed. More specifically, in embodiments wherein lid 104 includes second ledge 152, (when lid 104 is securely closed) second ledge 152 presses against peripheral lining 524, so that apart from fluidly coupling the filter outlets (of NBC filters 504) to outlet ports 118, outlet compartment 572 is fluidly sealed. Outlet compartment 572 is thus seen to function essentially similarly to outlet compartment 302 with peripheral lining 524 providing the fluidic sealing, which in NBC filtration system 300 is provided by first seal 220.

According to some embodiments, wherein frame 502 includes peripheral lining 534 (as depicted in the figures), the accommodation of NBC filter assembly within casing 100 defines an inlet compartment 574 similar to inlet compartment 304. Inlet compartment 574 fluidly couples blower 108 to the filter inlets (of NBC filters 504) but is otherwise fluidly sealed. The fluid-sealing provided by peripheral lining 534 in NBC filtration system 570 is essentially similar to the fluid-sealing provided by second seal 230 in NBC filtration system 300.

It is noted that to be affixed within casing 102, NBC filter assembly 500 may be dimensioned similarly to NBC filter 200, so that, according to some such embodiments, inlet compartment 574 and outlet compartment 572 may have the same, or substantially the same, dimensions as inlet compartment 304 and outlet compartment 302, respectively. In particular, according to some embodiments, inlet compartment 574 and outlet compartment 572 are of substantially the same lateral dimensions, which are smaller than those of upper section 136.

According to some embodiments, NBC filter assembly 500 is configured to allow secure storage thereof within casing 100 when wrapped by a protective wrapping (similar to wrapping 402 of wrapped NBC filter 400), or at least when NBC filters 504 are wrapped by a protective wrapping, thereby affording essentially the same protection to NBC filters 504 within casing 100, as the protection provided to NBC filter 200, within casing 100, by wrapping 402.

According to some embodiments, there is provided an NBC filter assembly similar to NBC filter assembly 500 but differing therefrom in housing a single NBC filter.

Figure 6A:
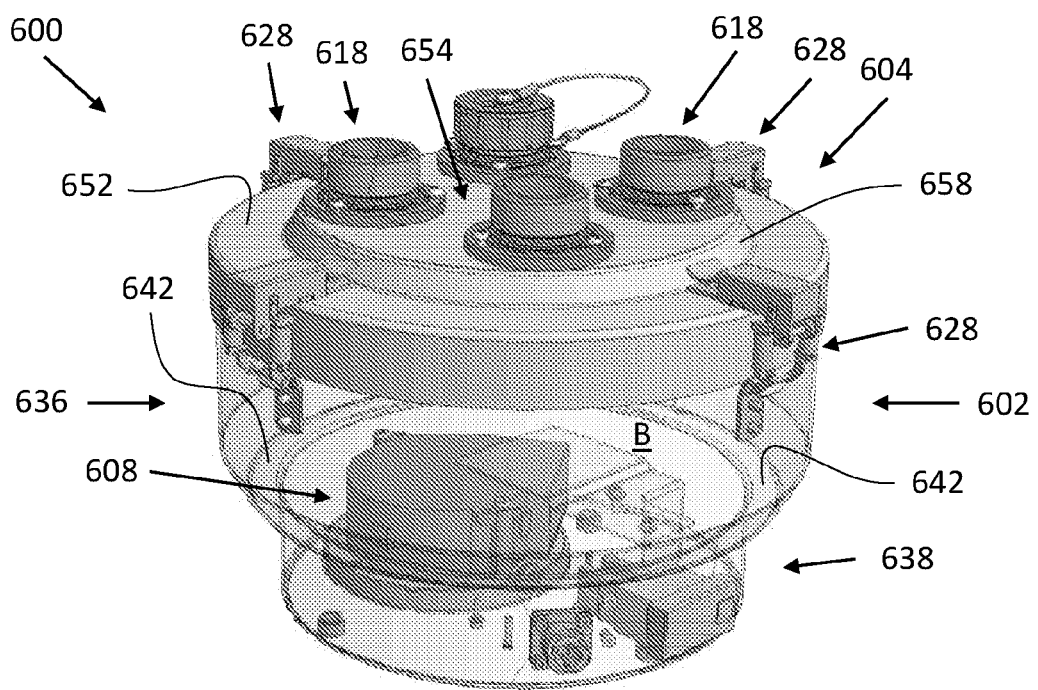
FIG. 6A is a perspective, front view from above of a cylindrical casing of an NBC filtration system, the casing being configured to accommodate therein a cylindrical NBC filter, according to some embodiments.

According to an aspect of some embodiments, and as schematically depicted in FIG. 6A, is provided a casing 600 (for an NBC filtration system), similar to casing 100, but differing therefrom in being cylindrical. Casing 600 may be configured to accommodate a cylindrical NBC filter, such as first NBC filter 504d or similar thereto. In particular, casing 600 may be configured to accommodate the standard NATO 1 filter.

More specifically, FIG. 6A is perspective front view of casing 600 from a vantage point higher than casing 600. Casing 600 includes a cylindrical casing body 602, a circular lid 604, and a blower 608 (which may be essentially similar to blower 108) housed within casing body 602 and configured to force air thereinto. To facilitate the description, casing body 602 is depicted as semi-transparent. Casing body 602 and lid 604 are similar to casing body 102 and lid 104 but differ therefrom in being cylindrical and circular, respectively. Casing body 602 includes an inlet port 616 fluidly connected to blower 608. Lid 604 includes a plurality of outlet ports 618 (for example, four, as depicted in figures), which may be essentially similar to outlet ports 118 of lid 104. In the figures, one of outlet ports 618 is shown with a cap (not numbered) fitted thereon.

Casing body 602 is hollow, defining an inner volume B therein, as specified below. Casing body 602 is open from above and includes a casing rim at the top end thereof (hidden from view by lid 604 in FIG. 6A). Lid 604 is shown shut, that is, mounted on the casing rim such as to close casing body 602 from above. One or more coupling elements 628 (for example, four, as depicted in the figures) are configured to mechanically secure lid 604 to casing body 602, similarly to the securing of lid 104 to casing body 102 provided by coupling elements 128.

According to some embodiments, casing body 602 includes an upper (first) section 636 and a lower (second) section 638 adjacent to upper section 636 and positioned below thereto. According to some embodiments, upper section 636 defines inner volume B. Upper section 636 is configured to accommodate an NBC filter, as depicted in FIG. 6C and elaborated on below. Lower section 638 includes inlet port 616 and houses blower 608.

According to some embodiments, casing body 602 includes a peripheral first ledge 642. First ledge 642 projects inwardly from a (cylindrical) sidewall 644 of casing body 602 and is configured to support an NBC filter, similarly to first ledge 142 and sidewalls 144 of casing body 102, which are configured to support NBC filter 200. First ledge 642 may be shaped as a seat, so that the lateral area defined by lower section 638 is smaller than the lateral area defined by upper section 636.

According to some embodiments, lid 604 includes a peripheral second ledge 652 having a function similar to peripheral second ledge 152 of lid 104. Second ledge 652 extends around a central portion 654 of lid 604. Central portion 654 includes outlet ports 618 and may be raised relative to second ledge 652, being connected thereto via a lid (central) sidewall 658. According to some embodiments, the area of central portion 654 is smaller than the area defined by upper section 636. According to some such embodiments, the area of central portion 654 is equal or about equal to the area defined by lower section 638.

According to some embodiments, casing body 602 includes one or more fasteners (not shown) configured to allow detachably securing casing 600 (particularly, with an NBC filter affixed therein) at any orientation thereof to a surface of any orientation (e.g. a ceiling). According to some embodiments, particularly, embodiments including the fasteners, casing body 602 is integrally formed, e.g. by pressing.

Figure 6B:
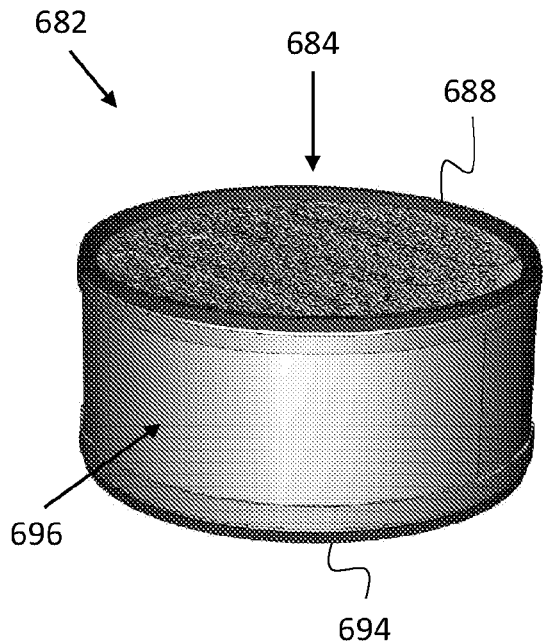
FIG. 6B is a perspective view from above of a cylindrical NBC filter configured to be accommodated within the casing of FIG. 6A, according to some embodiments.
Figure 6C:
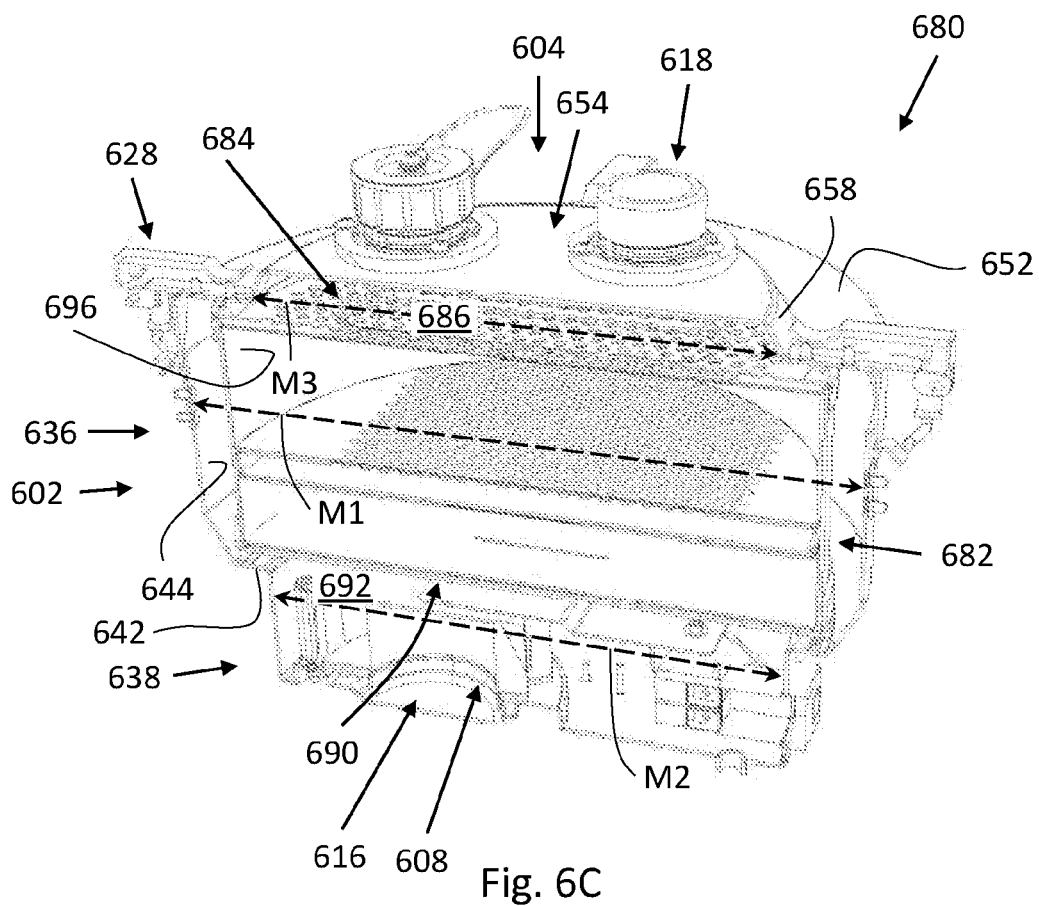
FIG. 6C is a perspective, front, cross-sectional view of an NBC filtration system including the cylindrical casing of FIG. 6A and the cylindrical NBC filter of FIG. 6B accommodated within the cylindrical casing, according to some embodiments.

FIG. 6B schematically depicts a cylindrical NBC filter 682 configured to be accommodated in upper section 636 of casing body 602, according to some embodiments. NBC filter 682 may be essentially similar to NBC filters 504. According to some embodiments, NBC filter 682 is a standard NATO 1 filter.

FIG. 6C schematically depict an NBC filtration system 680 including casing 600 and NBC filter 682 (accommodated within casing 600), according to some embodiments.

FIG. 6C is a perspective, front, cross-sectional view of NBC filtration system 680. According to some embodiments, and as seen in FIGS. 6C, NBC filter 682 is supported within casing body 602 by first ledge 642.

Casing 600 and NBC filter 682 are configured such that, when NBC filter 682 is affixed in casing body 602, a filter top face 684 (i.e. the top face of NBC filter 682) and lid 604 define an outlet compartment 686 therebetween (similarly to filter top face 204 and lid 104 which define outlet compartment 302 therebetween when NBC filter 200 is affixed in casing body 102). More specifically, filter top face 684 includes a first seal 688 disposed thereon along the periphery thereof and surrounding the filter outlet (of NBC filter 682; not numbered), so that when lid 604 is securely closed outlet compartment 686 fluidly couples the filter outlet to outlet ports 618, but is otherwise fluidly sealed by first seal 688, which is sandwiched between filter top face 684 and the inner surface (not numbered) of lid 604. According to some embodiments, wherein lid 604 includes second ledge 652, when lid 604 is closed, first seal 688 is sandwiched between filter top face 684 and second ledge 652. Due to the fluid-sealing provided by first seal 688, in operation (i.e. when NBC filtration system 680 is in use), any air entering outlet compartment 686 enters therein via the filter outlet and is therefore purified, and, consequently, any air entering outlet ports 618 is purified.

Coupling elements 628 are configured to enable the above-described fluid-sealing of outlet compartment 686 by pushing lid 604 against NBC filter 682, such as to press first seal 688, essentially similarly to how coupling elements 128 enable the fluid sealing of outlet compartment 302 of NBC filtration system 300.

When NBC filter 682 is accommodated within casing body 602, a filter bottom face 690 (i.e. the bottom face of NBC filter 682) closes lower section 638 from above such as to define an inlet compartment 692 in lower section 638 (and potentially also in a bottom portion of upper section 636).

According to some embodiments, NBC filter 682 includes a second seal 694 disposed on filter bottom face 690 along the periphery thereof and surrounding the filter inlet (not shown). Similarly to embodiments of NBC filtration system 300 wherein NBC filter 200 includes second seal 230, casing 600 and NBC filter 682 are configured such that, when NBC filter 682 is accommodated within casing body 602 and lid 604 is securely closed, inlet compartment 692 fluidly couples blower 608 to the filter inlet, but is otherwise fluidly sealed by second seal 694. According to some embodiments, and as depicted in FIG. 6C, second seal 694 is sandwiched between first ledge 642 and filter bottom face 690.

The diameters of upper section 636, lower section 638, and central portion 654 are indicated in FIG. 6C by double-headed, dashed arrows M1, M2, and M3, respectively. According to some embodiments, the lateral cross-section of inlet compartment 692 is defined by that of lower section 638 and the lateral cross-section of outlet compartment 686 is defined by that of central portion 654. According to some embodiments, M1≥M2, M3≈M2, M1≥M2, so that the lateral cross-section of upper section 636 (i.e. the lateral area of inner volume B) is greater than both the cross-section of inlet compartment 692 and the cross-section of outlet compartment 686, which are equal or substantially equal to one another.

Blower 608 may be configured to force air into casing body 602 (via inlet port 616), such as to create and maintain positive-pressure environments in inlet compartment 692 and outlet compartment 686.

It is noted that, in embodiments including second seal 694, the space surrounding a filter sidewall 696 of NBC filter 682 within casing 600 is fluidly disconnected from both outlet compartment 686 by first seal 688 and from inlet compartment 692 by second seal 694, and is ventilated to the atmosphere, e.g. by perforations (not shown) on sidewall 644 (essentially similarly to space S in NBC filtration system 300). This ventilation plays the same function as that provided by space S in NBC filtration system 300 (described above in the description of FIGS. 3A and 3B), helping to ensure that in the event of a failure of first seal 688, positive pressure applied by blower 608 still offers protection.

The skilled person will understand that the sealing components (first seal 688 and second seal 694) may be mounted in casing 600 instead of being mounted on NBC filter 682, similarly to as described above with respect to casing 100 and the sealing components thereof.

According to some embodiments, casing 600 is configured such as to allow securely accommodating NBC filter 682 therein, when NBC filter 682 is wrapped by a protective wrapping (similar to wrapping 402 of wrapped NBC filter 400), thereby affording essentially the same protection to NBC filter 682 within casing 600, as the protection provided to NBC filter 200, within casing 100, by wrapping 402. It will be understood that the adjective "first" used in reference to the term "seal", e.g. first seal 220, does not necessarily imply the presence of a second seal, e.g. second seal 230. That is, according to some embodiments, NBC filtration system 300 includes only first seal 220 and does not include second seal 230, while in other embodiments, and as depicted in the figures, NBC filtration system 300 includes both first seal 220 and second seal 230. Similarly, according to some embodiments, NBC filtration system 680 includes first seal 688 and does not include second seal 694.

As used herein, according to some embodiments, the term "fluid" encompasses gas and air. In particular, the terms "fluidly sealed" and "air-sealed/proof", derivatives thereof, and the like, may be used interchangeably. Similarly, according to some embodiments, the terms "fluidly coupled", and "in air-communication", derivatives thereof, and the like, may be used interchangeably.

As used herein, according to some embodiments, the terms "upper section" and "first section" with reference to section of a casing body, such as casing body 102, may be used interchangeably. According to some embodiments, "lower section" and "second section" with reference to section of a casing body, such as casing body 102, may be used interchangeably.

As used herein, according to some embodiments, the terms "at least one NBC filter" and "NBC filter assembly" may be used interchangeably.

As used herein, according to some embodiments, the terms "filtering" and "filtration" may be used interchangeably.

As used herein, according to some embodiments, the terms "locking means" and "lock" may be used interchangeably.

It is appreciated that certain features of the disclosure, which are, for clarity, described in the context of separate embodiments, may also be provided in combination in a single embodiment. Conversely, various features of the disclosure, which are, for brevity, described in the context of a single embodiment, may also be provided separately or in any suitable sub-combination or as suitable in any other described embodiment of the disclosure. No feature described in the context of an embodiment is to be considered an essential feature of that embodiment, unless explicitly specified as such.

Although the disclosure is described in conjunction with specific embodiments thereof, it is evident that numerous alternatives, modifications and variations that are apparent to those skilled in the art may exist. Accordingly, the disclosure embraces all such alternatives, modifications and variations that fall within the scope of the appended claims. It is to be understood that the disclosure is not necessarily limited in its application to the details of construction and the arrangement of the components and/or methods set forth herein. Other embodiments may be practiced, and an embodiment may be carried out in various ways.

The phraseology and terminology employed herein are for descriptive purpose and should not be regarded as limiting. Citation or identification of any reference in this application shall not be construed as an admission that such reference is available as prior art to the disclosure. Section headings are used herein to ease understanding of the specification and should not be construed as necessarily limiting.

The invention claimed is:

1. An NBC filtration system configured to provide positive-pressure, purified air to one or more sealable outlet ports, the system comprising:
   a casing body comprising a first section defining an inner volume therein, and a second section adjacent to the first section, the second section comprising an inlet port; the first section having a larger cross-section than the second section, and forming a peripheral first ledge projecting inwardly from sidewalls of the first section surrounding the second section and connecting the first section and the second section;
   at least one NBC filter accommodated in the inner volume, the at least one NBC filter being supported on the first ledge;
   a lid comprising a projecting central portion, sidewalls and a second ledge surrounding the central portion, the central portion comprising one or more outlet ports, which are sealable, the lid being openable to provide access to the inner volume and being securely closeable to affix the at least one NBC filter therein the inner volume by the second ledge; the lid and the at least one NBC filter defining, when the lid is securely closed, an outlet compartment there between, the outlet compartment having about the same cross-section as the second section;
   a first seal configured for fluid sealing of the outlet compartment;
   a second seal configured for fluid sealing of the second section; and
   a blower housed within the second section, a suction port of the blower being fluidly coupled to the inlet port;
   wherein the system is configured such that the second section fluidly couples the inlet port to at least one inlet of the respective at least one NBC filter, and, when the lid is securely closed, the outlet compartment fluidly couples at least one outlet of the at least one NBC filter to the respective one or more outlet ports; and
   wherein sidewalls of the casing body and sidewalls of the NBC filter define a space between the first seal and the second seal that is ventilated to the atmosphere, the system being thereby configured to continue to provide pressurized purified air also when one of the seals has been compromised.

2. The system of claim 1, wherein a first seal is disposed around the outlet of the NBC filter or circumferentially disposed along an inner surface of the lid, the first seal being configured to effect the fluid-sealing of the outlet compartment.

3. The system of claim 2, wherein a second seal is disposed around the inlet of the NBC filter or circumferentially disposed on the first ledge, such that, when the lid is securely closed, apart from fluidly coupling the inlet port to the inlet of the NBC filter, the second section is fluidly sealed.

4. The system of claim 1, wherein the one or more outlet ports comprise at least four outlet ports configured to be connected to air-ducts of face pieces.

5. The system of claim 1, further configured to accommodate in the inner volume the NBC filter, when the NBC filter is sealed within an air-proof wrapping, such that, when the lid is securely closed, the NBC filter is securely stored within the casing.

6. The system of claim 5, further comprising self-adjusting one or more coupling elements mechanically associating the casing body and the lid, the one or more coupling elements being configured to press on the NBC filter, when the NBC filter is accommodated in the casing body and the lid is securely closed, such as to (i) fluidly seal the outlet compartment when the NBC filter is unwrapped, and (ii) secure the NBC filter when the NBC filter is wrapped.

7. The system of claim 6, wherein the one or more coupling elements are spring-based and wherein the one or more coupling elements comprise levers mechanically associated with the springs such that, when the levers are fastened, the lid is securely closed.

8. The system of claim 1, wherein the system is substantially shaped in a form selected from the group consisting of: a cuboid and a cylinder.

9. The system of claim 1, wherein the casing body comprises fasteners configured to secure the system to a surface and wherein the system is further configured to be secured at any orientation thereof and onto a surface of any orientation.

10. The system of claim 8, wherein the casing body consists of a single piece.

11. The system of claim 5, wherein the wrapping of the NBC filter comprises a polymeric layer coated by an air-proof coating.

12. The system of claim 1, wherein the at least one NBC filter comprises two or more NBC filters, and wherein the system further comprises an NBC filter assembly accommodated within the inner volume, the NBC filter assembly including a frame and the two or more NBC filters, which are mounted within the frame.

13. The system of claim 1, for use in a vehicle.

14. An NBC filtration system configured to provide positive-pressure, purified air to one or more sealable outlet ports, the system comprising:
   a casing body comprising a first section defining an inner volume therein, and a second section adjacent to the first section, the second section comprising an inlet port;
   at least one NBC filter accommodated within the inner volume;
   a lid comprising one or more outlet ports, which are sealable, the lid being openable to provide access to the inner volume and being securely closeable to affix the at least one NBC filter therein the inner volume; the lid and the at least one NBC filter defining, when the lid is securely closed, an outlet compartment there between;
   a first seal configured for fluid sealing of the outlet compartment;

a second seal configured for fluid sealing of the second section; and a blower housed within the casing body and fluidly coupled to the inlet port;

wherein sidewalls of the casing body and sidewalls of the NBC filter define a space between the first seal and the second seal that is ventilated to the atmosphere, wherein the system is configured such that at least one inlet of the respective at least one NBC filter is fluidly coupled to the blower, and such that, when the lid is securely closed, at least one outlet of the respective at least one NBC filter is fluidly coupled to the outlet compartment so as to fluidly couple the outlet of the at least one NBC filter to the one or more outlet ports, the outlet compartment being otherwise fluidly sealed; and wherein the system is further configured to accommodate in the inner volume the at least one NBC filter, when the at least one NBC filter is sealed within an air-proof wrapping, such that, when the lid is securely closed, the at least one NBC filter is securely stored within the inner volume.

15. The system of claim 14, further comprising self-adjusting one or more coupling elements mechanically associating the casing body and the lid, the one or more coupling elements being configured to press on the NBC filter, when the NBC filter is accommodated in the casing body and the lid is securely closed, such as to (i) fluidly seal the outlet compartment when the NBC filter is unwrapped, and (ii) secure the NBC filter within the inner volume when the NBC filter is wrapped.

16. The system of claim 15, wherein the one or more coupling elements are spring-based.

17. The system of claim 16, wherein the system is substantially shaped as a cuboid, wherein the one or more coupling element comprise at least four coupling elements, and wherein four of the coupling elements are positioned at the four top corners of the casing, respectively.

18. The system of claim 17, wherein the one or more coupling elements comprise levers mechanically associated with the springs such that, when the levers are fastened, the lid is securely closed.

19. The system of claim 14, wherein the wrapping of the NBC filter comprises a polymeric layer coated by an air-proof coating.

* * * * *